(12) United States Patent
Song et al.

(10) Patent No.: US 12,197,667 B2
(45) Date of Patent: Jan. 14, 2025

(54) DISPLAY DEVICE

(71) Applicant: Samsung Display Co., Ltd., Yongin-si (KR)

(72) Inventors: Heerim Song, Yongin-si (KR); Cheol-Gon Lee, Yongin-si (KR); Mukyung Jeon, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/450,576

(22) Filed: Aug. 16, 2023

(65) Prior Publication Data

US 2024/0126389 A1    Apr. 18, 2024

(30) Foreign Application Priority Data

Oct. 18, 2022  (KR) .................. 10-2022-0133923

(51) Int. Cl.
*G06F 3/041* (2006.01)
*G06V 40/13* (2022.01)

(52) U.S. Cl.
CPC ........ *G06F 3/0412* (2013.01); *G06F 3/04166* (2019.05); *G06V 40/1306* (2022.01)

(58) Field of Classification Search
CPC .. G06F 3/0412; G06F 3/0416; G06F 3/04166; G06V 40/1318; G06V 40/1306
See application file for complete search history.

(56) References Cited

U.S. PATENT DOCUMENTS

| | | | |
|---|---|---|---|
| 6,876,345 B2 | 4/2005 | Akimoto et al. | |
| 2018/0173923 A1* | 6/2018 | Lee | G06F 3/0443 |
| 2021/0012078 A1* | 1/2021 | Chang | G06V 40/1318 |
| 2021/0157441 A1* | 5/2021 | Chen | G06F 3/0412 |

\* cited by examiner

*Primary Examiner* — Xuemei Zheng
(74) *Attorney, Agent, or Firm* — KILE PARK REED & HOUTTEMAN PLLC

(57) ABSTRACT

Disclosed is a display device including a plurality of touch sensing groups. Each of the plurality of touch sensing groups includes a plurality of write scan circuits, a plurality of pixels connected to the plurality of write scan circuits, a plurality of sensors connected to the plurality of write scan circuits, a plurality of first switching elements switching connections between the plurality of sensors and the plurality of write scan circuits, a touch sensing circuit connected to touch sensors connected one of the plurality of write scan circuits, and a second switching element switching a connection between the touch sensing circuit and the touch sensors.

20 Claims, 17 Drawing Sheets

DISPLAY DEVICE

CROSS REFERENCE TO RELATED APPLICATION(S)

This application claims priority to and the benefits of Korean Patent Application No. 10-2022-0133923 under 35 U.S.C. § 119, filed on Oct. 18, 2022, in the Korean Intellectual Property Office (KIPO), the entire contents of which are incorporated herein by reference.

BACKGROUND

1. Technical Field

Embodiments of the disclosure described herein relate to a display device.

2. Description of the Related Art

An electronic device, which provides images to users, such as a smart phone, a digital camera, a notebook computer, a navigation system, a smart television, and the like includes a display device for displaying the images. The display device includes a display panel for generating an image, an input device such as an input sensing part, a camera for capturing external images, and various sensors.

The input sensing part is disposed on the display panel to sense a user's input. The input sensing part is manufactured as a separate module and disposed on the display panel. The sensors may include a fingerprint sensor, a proximity sensor, an illuminance sensor, and the like. The fingerprint sensor among the sensors detects a fingerprint provided on a display panel. The fingerprint sensor is manufactured as a separate module and disposed in the display device.

SUMMARY

Embodiments of the disclosure provide a display device capable of performing fingerprint sensing and touch sensing by using sensors positioned in a display panel.

According to an embodiment, a display device may include a plurality of touch sensing groups. Each of the plurality of touch sensing groups may include a plurality of write scan circuits, a plurality of pixels connected to the plurality of write scan circuits, a plurality of sensors connected to the plurality of write scan circuits, a plurality of first switching elements switching connections between the plurality of sensors and the plurality of write scan circuits, a touch sensing circuit connected to touch sensors connected one of the plurality of write scan circuits, and a second switching element switching a connection between the touch sensing circuit and the touch sensors.

According to an embodiment, each of the plurality of write scan circuits may generate write scan signals and may transmit the write scan signals to the plurality of pixels.

According to an embodiment, during a first sensing mode, the plurality of first switching elements may be turned on, the write scan signals may be output as sensing scan signals through the plurality of first switching elements, and the sensing scan signals may be transmitted to the plurality of sensors.

According to an embodiment, during the first sensing mode, the second switching element may be turned off.

According to an embodiment, during the first sensing mode, the plurality of sensors may sense a fingerprint.

According to an embodiment, the touch sensing circuit may generate a touch sensing signal, the second switching element may be turned on during a second sensing mode, the touch sensing signal may be output as a sensing scan signal through the second switching element, and the sensing scan signal may be transmitted to the touch sensors.

According to an embodiment, during the second sensing mode, the plurality of first switching elements may be turned off.

According to an embodiment, during the second sensing mode, the touch sensors may sense a touch of a user.

According to an embodiment, during the first sensing mode and the second sensing mode, the plurality of pixels may display an image in response to the write scan signals.

According to an embodiment, the plurality of first switching elements may be controlled by a first control signal, the second switching element may be controlled by a second control signal, and the first control signal may be obtained by inverting the second control signal.

According to an embodiment, an operating frequency of the second sensing mode may be greater than an operating frequency of the first sensing mode.

According to an embodiment, each of the plurality of write scan circuits and the touch sensing circuit may have a same circuit configuration.

According to an embodiment, an operating frequency of the touch sensing circuit may be greater than an operating frequency of each of the plurality of write scan circuits.

According to an embodiment, each of the plurality of write scan circuits or the touch sensing circuit may include a first transistor including a control electrode receiving a first clock signal, a first electrode receiving a start signal, and a second electrode connected to a first node, a second transistor including a control electrode connected to a second node, a first electrode receiving a first voltage, and a second electrode, a third transistor including a control electrode receiving a second clock signal that is a signal obtained by inverting the first clock signal, a first electrode connected to the second electrode of the second transistor, and a second electrode connected to the first node, a fourth transistor including a control electrode connected to the first node, a first electrode connected to the second node, and a second electrode receiving the first clock signal, a fifth transistor including a control electrode receiving the first clock signal, a first electrode connected to the second node, and a second electrode receiving a second voltage having a level lower than the first voltage, a sixth transistor including a first electrode receiving the first voltage, a control electrode connected to the second node, and a second electrode connected to an output terminal, a seventh transistor including a first electrode connected to the output terminal, a second electrode receiving the second clock signal, and a control electrode, an eighth transistor including a control electrode receiving the second voltage, a first electrode connected to the first node, and a second electrode connected to the control electrode of the seventh transistor, a first capacitor connected between the control electrode of the sixth transistor and the first electrode of the second transistor, and a second capacitor connected between the first electrode of the seventh transistor and the control electrode of the seventh transistor.

According to an embodiment, in each of the plurality of touch sensing groups, the touch sensing circuit may include at least two touch sensing circuits, and the at least two touch sensing circuits may be connected to the touch sensors connected to at least two of the plurality of write scan circuits.

According to an embodiment, the second switching element may include at least two second switching elements, and the at least two second switching elements may switch connections between the touch sensors and the at least two touch sensing circuits.

According to an embodiment, a display device may include a plurality of touch sensing groups. Each of the plurality of touch sensing groups may include a plurality of first write scan circuits, a second write scan circuit, a plurality of pixels connected to the plurality of first write scan circuits and the second write scan circuit, a plurality of sensors connected to the plurality of first write scan circuits and the second write scan circuit, a first switching element switching a connection between the second write scan circuit and touch sensors connected to the second write scan circuit, a touch sensing circuit connected to the touch sensors, and a second switching element switching a connection between the touch sensing circuit and the touch sensors.

According to an embodiment, each of the plurality of first write scan circuits and the second write scan circuit may generate write scan signals and may transmit the write scan signals to the plurality of pixels. During a first sensing mode, the first switching element may be turned on, the second switching element may be turned off, the write scan signals may be output as a sensing scan signal through the first switching element, and the sensing scan signal may be transmitted to the touch sensors.

According to an embodiment, the touch sensing circuit may generate a touch sensing signal. During a second sensing mode, the first switching element may be turned off, the second switching element may be turned on, the touch sensing signal may be output as the sensing scan signal through the second switching element, and the sensing scan signal may be transmitted to the touch sensors.

According to an embodiment, the plurality of first write scan circuits, the second write scan circuit, and the touch sensing circuit may have a same circuit configuration.

BRIEF DESCRIPTION OF THE DRAWINGS

The above and other objects and features of the disclosure will become apparent by describing in detail embodiments thereof with reference to the accompanying drawings.

DETAILED DESCRIPTION OF THE EMBODIMENTS

Figure 1:
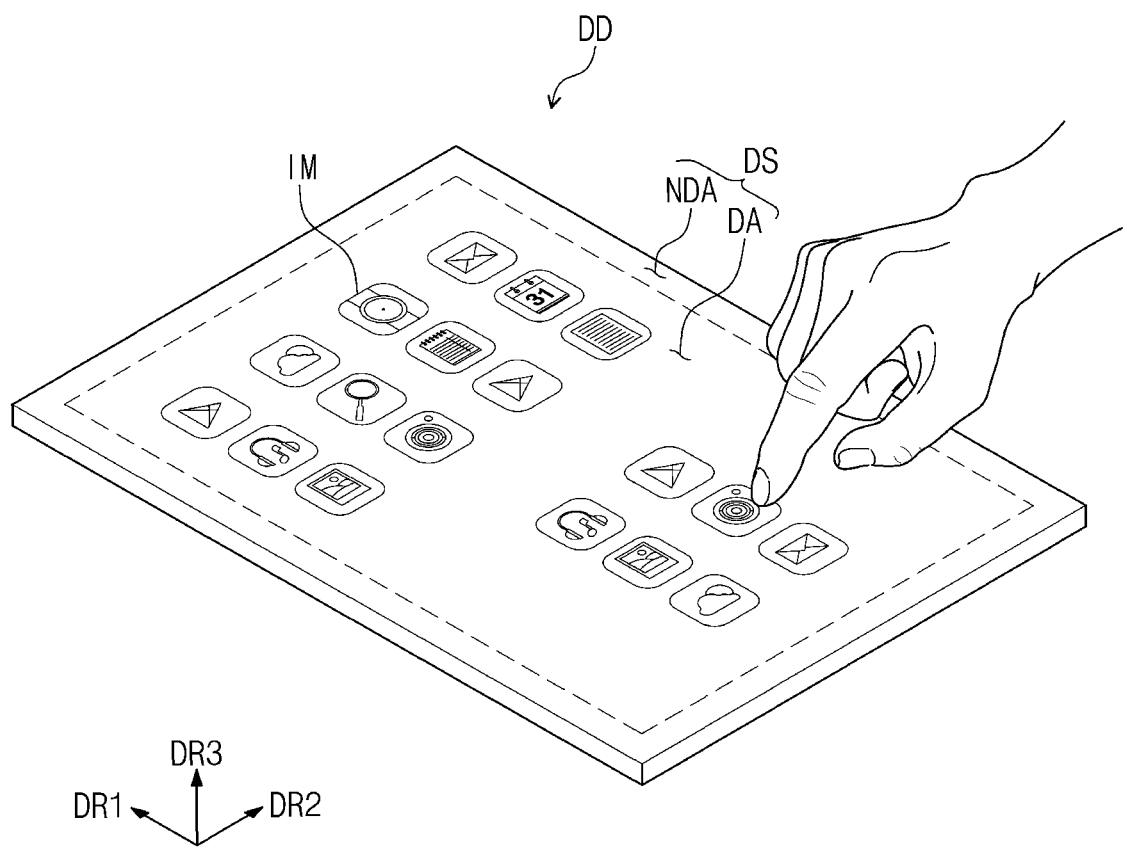
FIG. 1 is a schematic perspective view of a display device, according to an embodiment of the disclosure.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the first direction DR1, the second direction DR2, and the third direction DR3 are not limited to three axes of a rectangular coordinate system, such as the x, y, and z axes, and may be interpreted in a broader sense. For example, the first direction DR1, the second direction DR2, and the third direction DR3 may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

Unless otherwise specified, the illustrated embodiments are to be understood as providing example features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Like reference numerals refer to like components. Also, in drawings, the thickness, ratio, and dimension of components are exaggerated for effectiveness of description of technical contents.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

Although the terms "first", "second", etc. may be used to describe various components, the components should not be construed as being limited by the terms. The terms are only used to distinguish one component from another component. For example, without departing from the scope and spirit of the disclosure, a first component may be referred to as a second component, and similarly, the second component may be referred to as the first component. The articles "a," "an," and "the" are singular in that they have a single referent, but the use of the singular form in the specification should not preclude the presence of more than one referent.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some example embodiments may be physically separated into two or more interacting and discrete blocks, units, and/or modules without departing from the scope of the disclosure. Further, the blocks, units, and/or modules of some example embodiments may be physically combined into more complex blocks, units, and/or modules without departing from the scope of the disclosure.

Also, the terms "under", "lower", "beneath", "on", "above", etc. are used to describe a relationship between components illustrated in a drawing. The terms are relative and are described with reference to a direction indicated in the drawing. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the example term "below" can encompass both an orientation of above and below. Furthermore, the apparatus may be otherwise oriented (e.g., rotated 90 degrees or at other orientations), and, as such, the spatially relative descriptors used herein interpreted accordingly.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical terms and scientific terms) used in this specification have the same meaning as commonly understood by those skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the disclosure will be described with reference to accompanying drawings.

FIG. 1 is a schematic perspective view of a display device, according to an embodiment of the disclosure.

Referring to FIG. 1, a display device DD may have a rectangular shape having long sides extending in a first direction DR1 and short sides extending in a second direction DR2 intersecting the first direction DR1. However, the disclosure is not limited thereto, and the display device DD may have various shapes such as a circle, a polygon, or the like.

Hereinafter, a direction substantially perpendicular to a plane defined by the first direction DR1 and the second direction DR2 is defined as a third direction DR3. Moreover, in the specification, the meaning of "when viewed from above a plane" may be defined as "when viewed in the third direction DR3". A front surface (or a top surface) and a rear surface (or a bottom surface) of each of layers or units may be distinguished by the third direction DR3. However, directions indicated by the first to third directions DR1, DR2, and DR3 may be a relative concept, and converted with respect to each other, e.g., converted into opposite directions.

A top surface of the display device DD may be defined as a display surface DS, and may have a plane defined by the first direction DR1 and the second direction DR2. Images IM generated by the display device DD may be provided to a user through the display surface DS.

The display surface DS may include a display area DA and a non-display area NDA disposed adjacent to the display area DA. The display area DA may display an image, and the non-display area NDA may not display an image. The non-display area NDA may surround the display area DA and may define a border of the display device DD printed in a color (e.g., a predetermined or selectable color).

The display device DD may be used for a large electronic device such as a television, a monitor, an outer billboard, or the like. The display device DD may be used for small and medium electronic devices such as a personal computer, a notebook computer, a personal digital terminal, an automotive navigation system, a game console, a smartphone, a tablet, a camera, or the like. However, the above examples are provided merely as an embodiment, and it is obvious that the display device DD may be applied to any other electronic device(s) without departing from a technical spirit of the disclosure.

Figure 2:
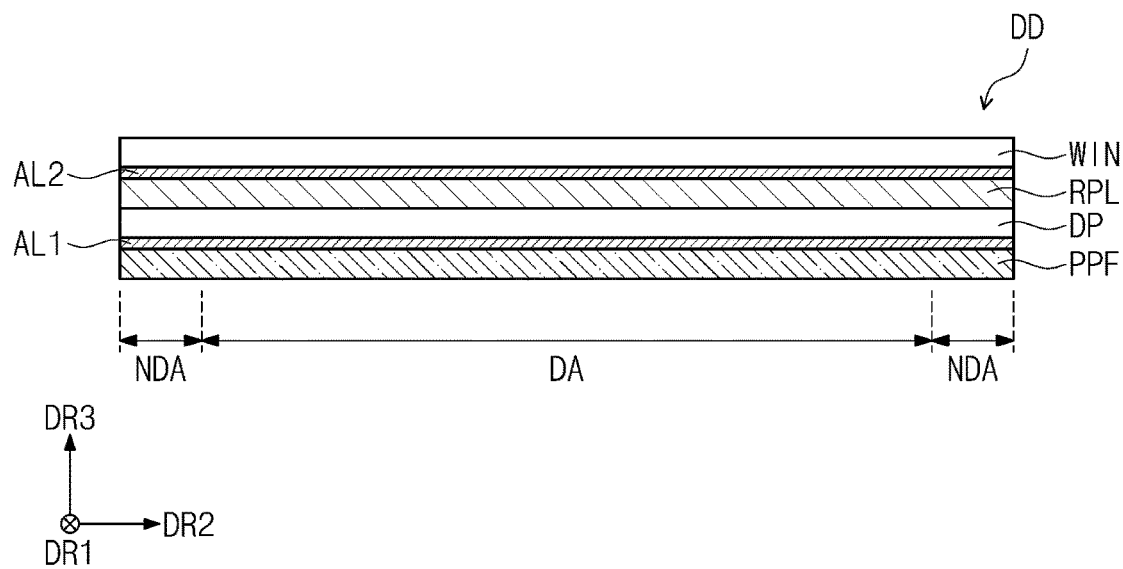
FIG. 2 is a schematic cross-sectional view of the display device shown in FIG. 1.

FIG. 2 is a schematic cross-sectional view of the display device shown in FIG. 1.

FIG. 2 schematically illustrates a cross-section of the display device DD viewed in the first direction DR1.

Referring to FIG. 2, the display device DD may include a display panel DP, an anti-reflection layer RPL, a window WIN, a panel protection film PPF, and first and second adhesive layers AL1 and AL2.

The display panel DP may be a flexible display panel. The display panel DP according to an embodiment of the disclosure may be a light emitting display panel, but is not particularly limited thereto. For example, the display panel DP may be an organic light emitting display panel or an inorganic light emitting display panel. A light emitting layer of the organic light emitting display panel may include an organic light emitting material. A light emitting layer of the inorganic light emitting display panel may include a quantum dot, a quantum rod, or the like. Hereinafter, it is described that the display panel DP is an organic light emitting display panel.

The display panel DP may perform a fingerprint sensing function and a touch sensing function. A configuration of the display panel DP will be described in detail below.

The anti-reflection layer RPL may be disposed on the display panel DP. The anti-reflection layer RPL may be arranged (e.g., directly arranged) on the display panel DP when manufacturing the display device DD. However, it is not limited thereto, and the anti-reflection layer RPL may be manufactured as a separate module and attached to the display panel DP by an adhesive layer.

The anti-reflection layer RPL may be defined as an external light anti-reflection film. The anti-reflection layer RPL may reduce reflectance of external light incident from the top surface of the display device DD toward the display panel DP. The external light may not be perceived to a user due to the anti-reflection layer RPL.

The window WIN may be disposed on the anti-reflection layer RPL. The window WIN may protect the display panel DP and the anti-reflection layer RPL from external scratches and impacts.

The panel protection film PPF may be disposed under the display panel DP. The panel protection film PPF may protect a bottom surface of the display panel DP. The panel protection film PPF may include a flexible plastic material such as Polyethyleneterephthalate (PET) or the like.

The first adhesive layer AL1 may be interposed between the display panel DP and the panel protection film PPF, and the display panel DP and the panel protection film PPF may be bonded to each other by the first adhesive layer AL1. The second adhesive layer AL2 may be interposed between the window WIN and the anti-reflection layer RPL, and the window WIN and the anti-reflection layer RPL may be bonded to each other by the second adhesive layer AL2.

Figure 3:
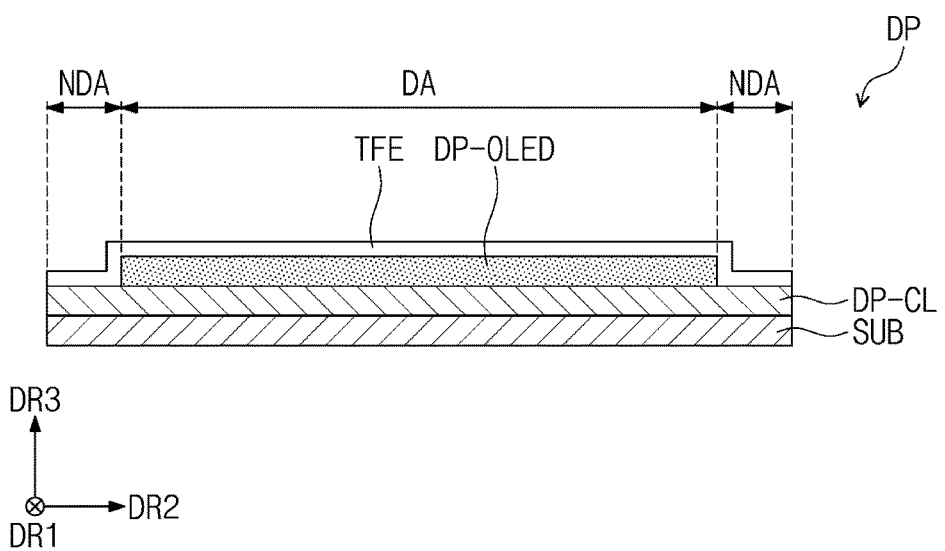
FIG. 3 is a schematic cross-sectional view of the display panel shown in FIG. 2.

FIG. 3 is a schematic cross-sectional view of the display panel shown in FIG. 2.

FIG. 3 schematically illustrates a cross-section of the display panel DP viewed in the first direction DR1.

Referring to FIG. 3, the display panel DP may include a substrate SUB, a circuit element layer DP-CL disposed on the substrate SUB, a display element layer DP-OLED disposed on the circuit element layer DP-CL, and a thin film encapsulation layer TFE disposed on the display element layer DP-OLED.

The substrate SUB may include the display area DA and the non-display area NDA adjacent to the display area DA. The substrate SUB may include a flexible plastic material such as glass, polyimide (PI), or the like. The display element layer DP-OLED may be disposed in the display area DA.

Multiple pixels may be disposed in the circuit element layer DP-CL and the display element layer DP-OLED. Each of the pixels may include a transistor disposed in the circuit element layer DP-CL and a light emitting element disposed in the display element layer DP-OLED and connected to the transistor. A configuration of the pixel will be described in detail below.

The thin film encapsulation layer TFE may be disposed on the circuit element layer DP-CL and cover the display element layer DP-OLED. The thin film encapsulation layer TFE may protect pixels from moisture, oxygen, foreign objects, and the like.

Figure 4:
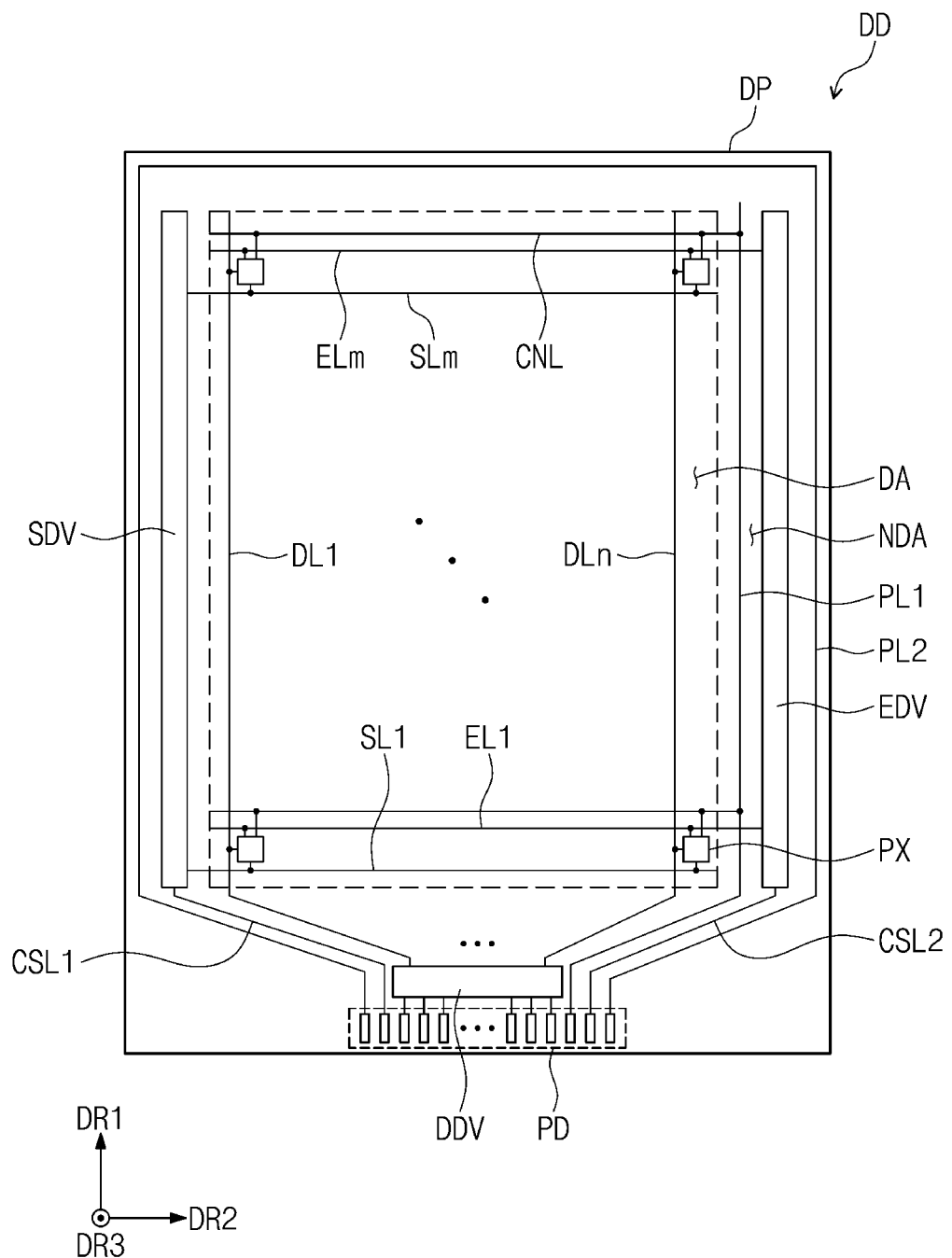
FIG. 4 is a schematic plan view of the display panel shown in FIG. 2.

FIG. 4 is a schematic plan view of the display panel shown in FIG. 2.

Referring to FIG. 4, the display device DD may include the display panel DP, a scan driver SDV, a data driver DDV, a light emission driver EDV, and multiple pads PD.

The display panel DP may have a rectangular shape having long sides extending in the first direction DR1 and short sides extending in the second direction DR2 in a plan view. However, a shape of the display panel DP is not limited thereto. The display panel DP may include the display area DA and the non-display area NDA surrounding the display area DA.

The display panel DP may include multiple pixels PX, multiple scan lines SL1 to SLm, multiple data lines DL1 to DLn, multiple emission lines EL1 to ELm, first and second control lines CSL1 and CSL2, first and second power supply lines PL1 and PL2, and connection lines CNL. Each of 'm' and 'n' may be a natural number. Although not shown in drawings, the display panel DP may include multiple sensors disposed adjacent to the pixels PX. A configuration of sensors will be described in detail below.

The pixels PX may be positioned in the display area DA. The scan driver SDV and the light emission driver EDV may be disposed in the non-display area NDA adjacent to each of the long sides of the display panel DP. The data driver DDV may be arranged in the non-display area NDA adjacent to one of the short sides of the display panel DP. In a plan view, the data driver DDV may be disposed adjacent to a bottom end of the display panel DP.

The scan lines SL1 to SLm may extend in the second direction DR2 and may be connected to the pixels PX and the scan driver SDV. The data lines DL1 to DLn may extend in the first direction DR1 and may be connected to the pixels PX and the data driver DDV. The emission lines EL1 to ELm may be extended in the second direction DR2 and may be connected to pixels PX and the light emission driver EDV.

The first power supply line PL1 may extend in the first direction DR1 and may be disposed in the non-display area NDA. The first power supply line PL1 may be positioned between the display area DA and the light emission driver EDV.

The connection lines CNL may extend in the second direction DR2 and be arranged in the first direction DR1 to be connected to the first power supply line PL1 and the pixels PX. A first voltage may be applied to the pixels PX through the first power supply line PL1 and the connecting lines CNL that are connected to each other.

The second power supply line PL2 may be positioned in the non-display area NDA, and may extend along the long sides of the display panel DP and another one of the short sides of the display panel DP at which the data driver DDV is not positioned. The second power supply line PL2 may be positioned outside the scan driver SDV and the light emission driver EDV in a plan view.

Although not shown, the second power supply line PL2 may extend toward the display area DA so as to be connected to the pixels PX. A second voltage having a level lower than the first voltage may be applied to the pixels PX through the second power supply line PL2.

The first control line CSL1 may be connected to the scan driver SDV and may extend toward the bottom end of the display panel DP. The second control line CSL2 may be connected to the light emission driver EDV and may extend toward the bottom end of the display panel DP. The data driver DDV may be interposed between the first control line CSL1 and the second control line CSL2.

The pads PD may be positioned in the non-display area NDA adjacent to the bottom end of the display panel DP, and may be disposed closer to the bottom end of the display panel DP than the data driver DDV. The data driver DDV, the first and second power supply lines PL1 and PL2, and the first and second control lines CSL1 and CSL2 may be connected to the pads PD. The data lines DL1 to DLn may be connected to the data driver DDV. The data driver DDV may be connected to the pads PD corresponding to the data lines DL1 to DLn.

Although not shown, the display device DD may further include a timing controller for controlling operations of the scan driver SDV, the data driver DDV, and the light emission driver EDV, and a voltage generator for generating first and second voltages. The timing controller and the voltage generator may be mounted on a printed circuit board and connected to the pads PD through the printed circuit board.

The scan driver SDV may generate multiple scan signals. The scan signals may be applied to the pixels PX through the scan lines SL1 to SLm. The data driver DDV may generate multiple data voltages. The data voltages may be applied to the pixels PX through the data lines DL1 to DLn. The emission driver EDV may generate multiple emission signals. The emission signals may be applied to the pixels PX through the emission lines EL1 to ELm.

The pixels PX may receive the data voltages in response to the scan signals. The pixels PX may display images by emitting light of luminance corresponding to the data voltages in response to the emission signals.

Figure 5:
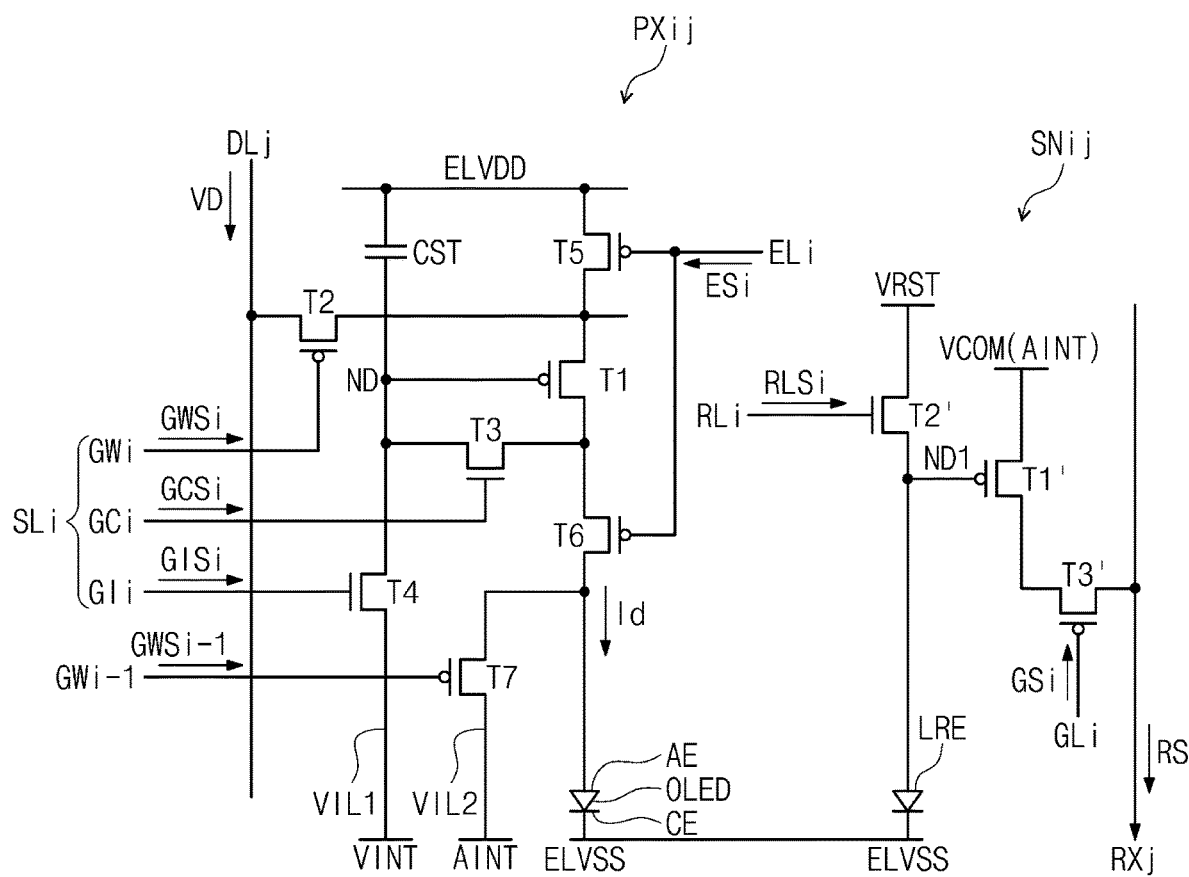
FIG. 5 is a schematic diagram showing an equivalent circuit of a pixel among pixels shown in FIG. 4 and a sensor adjacent to the pixel.

FIG. 5 is a schematic diagram showing an equivalent circuit of one pixel among the pixels shown in FIG. 4 and a sensor adjacent to the pixel.

In an embodiment, a pixel PXij may be connected to an i-th scan line SLi, an i-th emission line ELi, and a j-th data line DLj. In an embodiment, a sensor SNij may be connected to an i-th reset line RLi and a j-th reception line RXj. Each of 'i' and 'j' may be a natural number.

Referring to FIG. 5, the pixel PXij may include a light emitting element OLED, multiple transistors T1 to T7, and a capacitor CST. The transistors T1 to T7 and the capacitor CST may control the amount of current flowing through the light emitting element OLED. The light emitting element OLED may generate light having a luminance depending on the amount of current supplied thereto.

The i-th scan line SLi may include an i-th write scan line GWi, an i-th compensation scan line GCi, and an i-th initialization scan line GIi. The i-th write scan line GWi may receive an i-th write scan signal GWSi, the i-th compensation scan line GCi may receive an i-th compensation scan signal GCSi, and the i-th initialization scan line GIi may receive an i-th initialization scan signal GISi.

One of a source electrode and a drain electrode of each of the transistors described herein may be referred to as a first electrode, and another one of the source electrode and the drain electrode may be referred to as a second electrode. A gate electrode of each of the transistors may be referred to as a control electrode.

The transistors T1 to T7 may include the first to seventh transistors T1 to T7. In an embodiment, the first, second, fifth, sixth, and seventh transistors T1, T2, T5, T6, and T7 may be PMOS transistors, and the third and fourth transistors T3 and T4 may be NMOS transistors. Each of the first to seventh transistors T1 to T7 may include a source electrode, a drain electrode, and a gate electrode.

The light emitting element OLED may be an organic light emitting element. The light emitting element OLED may include an anode AE and a cathode CE. The anode AE may receive a first voltage ELVDD through the sixth, first, and fifth transistors T6, T1, and T5. The cathode CE may receive a second voltage ELVSS.

The first transistor T1 may be connected between the fifth transistor T5 and the sixth transistor T6. The first transistor T1 may include a first electrode receiving the first voltage ELVDD through the fifth transistor T5, a second electrode connected to the anode AE through the sixth transistor T6, and a control electrode connected to a node ND.

The first electrode of the first transistor T1 may be connected to the fifth transistor T5, and the second electrode of the first transistor T1 may be connected to the sixth transistor T6. The first transistor T1 may control the amount of current flowing through the light emitting element OLED depending on the voltage of the node ND applied to the control electrode of the first transistor T1.

The second transistor T2 may be connected between the data line DLj and the first electrode of the first transistor T1. The second transistor T2 may include a first electrode connected to the data line DLj, a second electrode connected to the first electrode of the first transistor T1, and a control electrode connected to the i-th write scan line GWi.

The second transistor T2 may be turned on by the i-th write scan signal GWSi applied through the i-th write scan line GWi to electrically connect the data line DLj to the first electrode of the first transistor T1. The second transistor T2 may perform a switching operation of providing a data voltage VD applied through the data line DLj to the first electrode of the first transistor T1.

The third transistor T3 may be connected between the second electrode of the first transistor T1 and the node ND. The third transistor T3 may include a first electrode connected to the second electrode of the first transistor T1, a second electrode connected to the node ND, and a control electrode connected to the i-th compensation scan line GCi.

The third transistor T3 may be turned on by the i-th compensation scan signal GCSi applied through the i-th compensation scan line GCi to electrically connect the second electrode of the first transistor T1 and the control electrode of the first transistor T1. In case that the third transistor T3 is turned on, the first transistor T1 and the third transistor T3 may be diode-connected.

The fourth transistor T4 may be connected to the node ND. The fourth transistor T4 may include a first electrode connected to the node ND, a second electrode connected to a first initialization line VIL1, and a control electrode connected to the i-th initialization scan line GIi. The fourth transistor T4 may be turned on by the i-th initialization scan signal GISi applied through the i-th initialization scan line GIi and may provide a first initialization voltage VINT applied through the first initialization line VIL1 to the node ND.

The fifth transistor T5 may include a first electrode receiving the first voltage ELVDD, a second electrode connected to the first electrode of the first transistor T1, and a control electrode connected to the i-th emission line ELi.

The sixth transistor T6 may include a first electrode connected to the second electrode of the first transistor T1, a second electrode connected to the anode AE, and a control electrode connected to the i-th emission line ELi.

The fifth transistor T5 and the sixth transistor T6 may be turned on by an i-th emission signal ESi applied through the i-th emission line ELi. The first voltage ELVDD may be provided to the light emitting element OLED by the turned-on fifth transistor T5 and the turned-on sixth transistor T6 to transmit a driving current to the light emitting element OLED. Accordingly, the light emitting element OLED may emit light.

The seventh transistor T7 may include a first electrode connected to the anode AE, a second electrode connected to a second initialization line VIL2, and a control electrode connected to an (i−1)-th write scan line GWi−1. The (i−1)-th write scan line GWi−1 may be defined as a write scan line of a previous stage of the i-th write scan line GWi.

The seventh transistor T7 may be turned on by an (i−1)-th write scan signal GWSi−1 applied through the (i−1)-th write scan line GWi−1, and thus may provide a second initialization voltage AINT received through the second initialization line VIL2 to the anode AE of the light emitting element OLED.

In an embodiment of the disclosure, the second initialization voltage AINT may have a different level from the first initialization voltage VINT, but is not limited thereto. For example, the second initialization voltage AINT and the first initialization voltage VINT may have a same level.

The capacitor CST may include a first electrode receiving the first voltage ELVDD and a second electrode connected to the node ND. In case that the fifth transistor T5 and the sixth transistor T6 are turned on, the amount of current flowing to the first transistor T1 may be determined depending on the voltage stored in the capacitor CST.

The display panel DP may include the sensor SNij as well as the pixel PXij. The sensor SNij shown in FIG. 5 may include multiple sensors, and the sensors may be provided to the display panel DP.

The sensor SNij may include a first transistor T1', a second transistor T2', a third transistor T3', and a light receiving element LRE. The first and third transistors T1' and T3' may be PMOS transistors, and the second transistor T2' may be an NMOS transistor.

The first transistor T1' may include a first electrode receiving a voltage VCOM having a voltage level (e.g., a predetermined or selectable voltage level), a control electrode connected to a node ND1, and a second electrode connected to the third transistor T3'. The voltage VCOM may be set to the second initialization voltage AINT, but is not limited thereto. For example, the voltage VCOM may be set to another voltage level.

The second transistor T2' may include a first electrode connected to the node ND1, a control electrode connected to the i-th reset line RLi, and a second electrode receiving a reset voltage VRST. The second transistor T2' may be turned on by the i-th reset signal RLSi received through the i-th reset line RLi.

The third transistor T3' may include a first electrode connected to the second electrode of the first transistor T1', a control electrode connected to an i-th sensing scan line GLi, and a second electrode connected to the reception line RXj. The third transistor T3' may be turned on by an i-th sensing scan signal GSi received through the i-th sensing scan line GLi.

The light receiving element LRE may include a photodiode. An anode of the light receiving element LRE may be connected to the node ND1, and a cathode of the light receiving element LRE may receive the second voltage ELVSS. The light receiving element LRE may convert light energy incident from outside into electrical energy.

Figure 6:
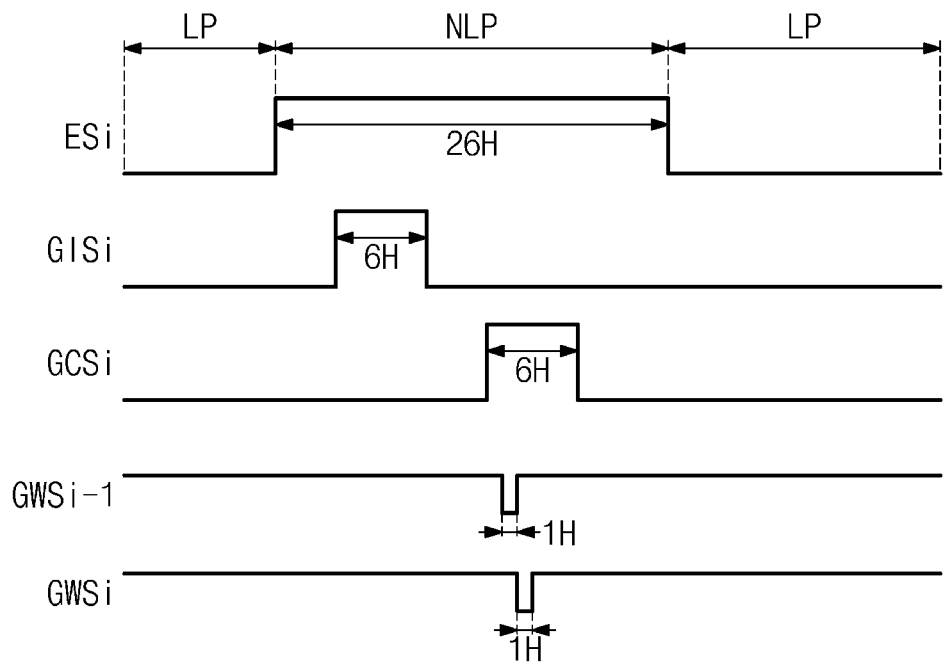
FIG. 6 is a schematic timing diagram of signals for driving the pixel shown in FIG. 5.
Figure 7:
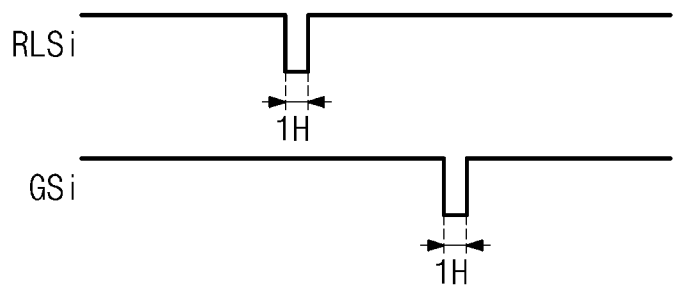
FIG. 7 is a schematic timing diagram of signals for driving the sensor shown in FIG. 5.

FIG. 6 is a schematic timing diagram of signals for driving the pixel shown in FIG. 5. FIG. 7 is a schematic timing diagram of signals for driving the sensor shown in FIG. 5.

Referring to FIGS. 5 and 6, the i-th emission signal ESi may have a high level during a non-emission period NLP and a low level during an emission period LP. The i-th write scan signal GWSi may have a low level during an activation period. Each of the i-th compensation scan signal GCSi and the i-th initialization scan signal GISi may have a high level during an activation period.

After the i-th initialization scan signal GISi is activated, the i-th compensation scan signal GCSi and the i-th write scan signal GWSi may be activated. During the non-emission period NLP, the i-th initialization scan signal GISi, the i-th compensation scan signal GCSi, and the i-th write scan signal GWSi, which are activated, may be applied to the pixel PXij.

The i-th initialization scan signal GISi may be applied to the fourth transistor T4 to turn on the fourth transistor T4.

The first initialization voltage VINT may be provided to the node ND through the fourth transistor T4. Accordingly, the first initialization voltage VINT may be applied to the control electrode of the first transistor T1, and the first transistor T1 may be initialized by the first initialization voltage VINT.

Although not illustrated in drawings, the (i−1)-th write scan signal GWSi−1 activated before the i-th write scan signal GWSi may be applied to the control electrode of the seventh transistor T7 to turn on the seventh transistor T7. The second initialization voltage AINT may be provided to the anode AE through the seventh transistor T7, and thus the anode AE may be initialized to the second initialization voltage AINT.

After initialization, the i-th write scan signal GWSi may be applied to the second transistor T2 to turn on the second transistor T2. The i-th compensation scan signal GCSi may be applied to the third transistor T3 to turn on the third transistor T3.

The first transistor T1 and the third transistor T3 may be diode-connected to each other. A compensation voltage VD-Vth obtained by reducing the data voltage VD supplied through the data line DLj by a threshold voltage Vth of the first transistor T1 may be applied to the control electrode of the first transistor T1.

The first voltage ELVDD and compensation voltage VD-Vth may each be applied to a first electrode of the capacitor CST and a second electrode of the capacitor CST. Charges corresponding to a difference between a voltage of the first electrode of the capacitor CST and a voltage of the second electrode of the capacitor CST may be stored in the capacitor CST.

During the emission period LP, the i-th emission signal ESi may be applied to the fifth transistor T5 and the sixth transistor T6 through the i-th emission line ELi to turn on the fifth transistor T5 and the sixth transistor T6. A driving current Id corresponding to a voltage difference between the voltage of the control electrode of the first transistor T1 and the first voltage ELVDD may be generated. The driving current Id may be provided to the light emitting element OLED through the sixth transistor T6, and thus the light emitting element OLED may emit light.

During the emission period LP, a gate-source voltage Vgs of the first transistor T1 by the capacitor CST may be defined as "Vgs=ELVDD−(Vd−Vth)". An equation of a relationship between a current and a voltage of the first transistor T1 may be defined as "Id=(½)μCox(W/L)(Vgs−Vth)$^2$". This equation may be an equation of a relationship between a current and a voltage of a typical transistor.

In case that Vgs is substituted into the equation of a relationship between a current and a voltage, the threshold voltage Vth may be removed, and the driving current Id may be proportional to a square value "(ELVDD−Vd)", which is a value obtained by subtracting the data voltage VD from the first voltage ELVDD. Accordingly, the driving current Id may be determined regardless of the threshold voltage Vth of the first transistor T1. This operation may be defined as a threshold voltage compensation operation.

Referring to FIGS. 5 and 7, after the i-th reset signal RLSi is activated, the i-th sensing scan signal GSi may be activated. The i-th reset signal RLSi may be applied to the control electrode of the second transistor T2' to turn on the second transistor T2'. The turned-on second transistor T2' may receive the reset voltage VRST and may provide the reset voltage VRST to the node ND1.

The node ND1 may be reset by the reset voltage VRST. The voltage of the node ND1 may be substantially the gate voltage of the first transistor T1'. Accordingly, the first transistor T1' may be reset by applying the reset voltage VRST to the control electrode of the first transistor T1'.

The i-th sensing scan signal GSi may be applied to the control electrode of the third transistor T3' to turn on the third transistor T3'. The first transistor T1' may be connected to the j-th reception line RXj by through the turned-on third transistor T3'.

The light receiving element LRE may receive light and may convert the light into an electrical signal. The voltage of the node ND1 may change. In case that the first transistor T1' is turned on, the voltage VCOM provided to the first transistor T1' may be controlled depending on the voltage of the node ND1 and may be provided to the j-th reception line RXj through the third transistor T3'. Accordingly, a signal sensed by the light receiving element LRE may be output as a sensing signal RS through the j-th reception line RXj.

Figure 8:
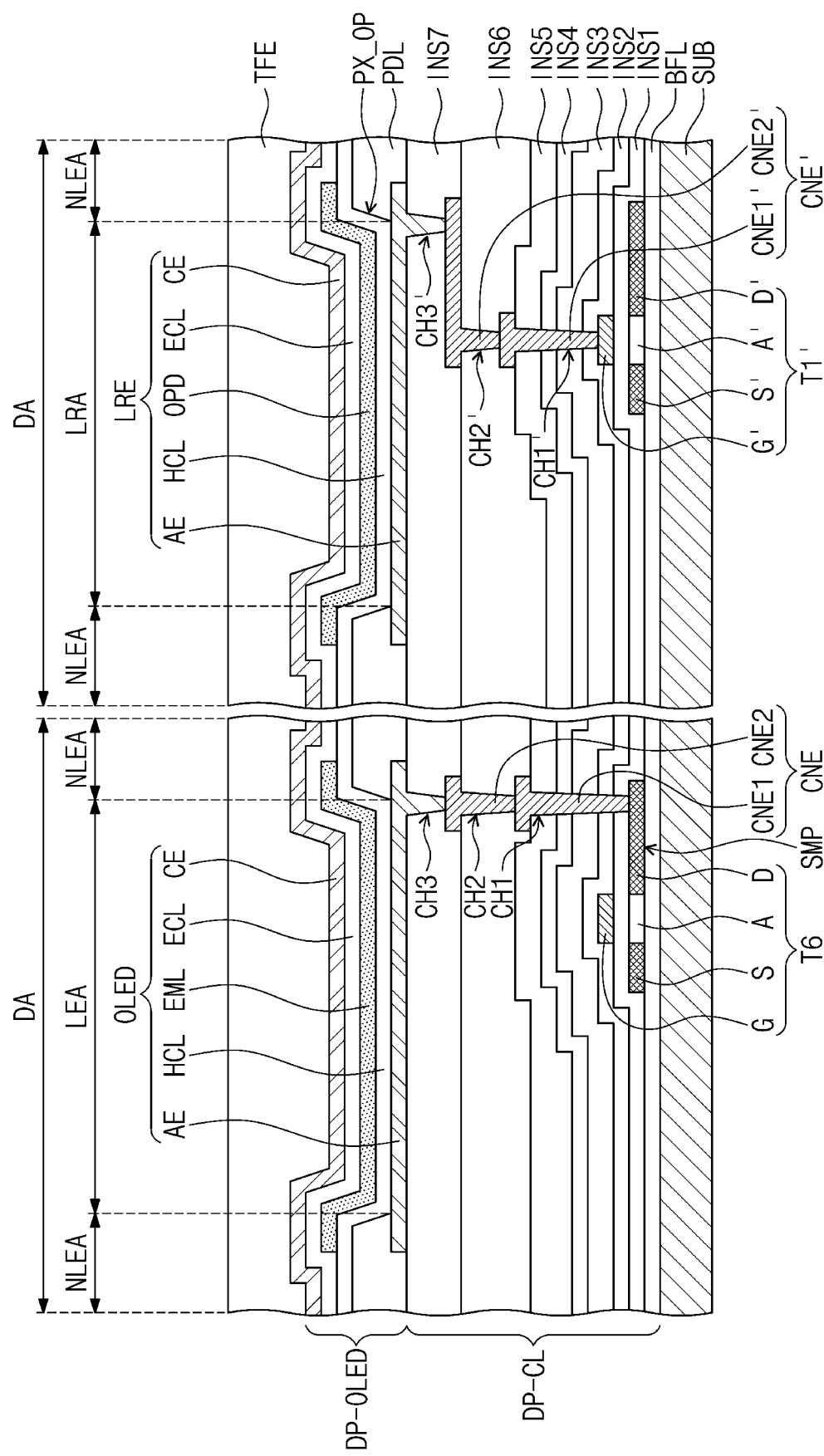
FIG. 8 is a schematic cross-sectional view of a light emitting element and a light receiving element shown in FIG. 5.

FIG. 8 is a schematic cross-sectional view of a light emitting element and a light receiving element shown in FIG. 5.

Referring to FIG. 8, according to an embodiment, the light emitting element OLED may include a first electrode AE, a second electrode CE, a hole control layer HCL, an electron control layer ECL, and a light emitting layer EML. The first electrode AE may be the anode AE shown in FIG. 5, and the second electrode CE may be the cathode CE shown in FIG. 5.

The sixth transistor T6 and the light emitting element OLED may be disposed on the substrate SUB. The display area DA may include an emission area LEA corresponding to the pixel PXij and a non-emission area NLEA adjacent to the emission area LEA. The light emitting element OLED may be positioned in the emission area LEA.

A buffer layer BFL may be disposed on the substrate SUB. A semiconductor pattern SMP of the sixth transistor T6 may be disposed on the buffer layer BFL. The semiconductor pattern SMP may be doped with an N-type dopant or a P-type dopant. The semiconductor pattern SMP may include a highly-doped area and a lightly-doped area. Conductivity of the highly-doped area may be greater than conductivity of the lightly-doped area. The highly-doped area may substantially operate as a source electrode or a drain electrode of the sixth transistor T6. The lightly-doped area may substantially correspond to an active (or channel) of a transistor (e.g., the sixth transistor T6).

A source electrode S, an active A, and a drain electrode D of the sixth transistor T6 may be formed from the semiconductor pattern SMP. The active A may be positioned between the source electrode S and the drain electrode D.

A first insulating layer INS1 may be disposed on the buffer layer BFL and cover the semiconductor pattern SMP. A gate electrode G (or a control electrode) of the sixth transistor T6 may be disposed on the first insulating layer INS1.

A second insulating layer INS2 may be disposed on the first insulating layer INS1 and cover the gate electrode G. A third insulating layer INS3, a fourth insulating layer INS4, and a fifth insulating layer INS5 may be sequentially stacked and disposed on the second insulating layer INS2. The buffer layer BFL and the first to fifth insulating layers INS1 to INS5 may be inorganic layers.

A connection electrode CNE may be interposed between the sixth transistor T6 and the light emitting element OLED. The connection electrode CNE may electrically connect the sixth transistor T6 and the light emitting element OLED. The connection electrode CNE may include a first connection electrode CNE1 and a second connection electrode CNE2 disposed on the first connection electrode CNE1.

The first connection electrode CNE1 may be disposed on the fifth insulating layer INS5, and may be connected to the drain electrode D through a first contact hole CH1 defined in the first to fifth insulating layers INS1 to INS5. A sixth insulating layer INS6 may be disposed on the fifth insulating layer INS5 and cover the first connection electrode CNE1.

The second connection electrode CNE2 may be disposed on the sixth insulating layer INS6. The second connection electrode CNE2 may be connected to the first connection electrode CNE1 through a second contact hole CH2 defined in the sixth insulating layer INS6.

The seventh insulating layer INS7 may be disposed on the sixth insulating layer INS6 and cover the second connection electrode CNE2. The sixth and seventh insulating layers INS6 and INS7 may be an inorganic layer or an organic layer.

The first electrode AE may be disposed on the seventh insulating layer INS7. The first electrode AE may be electrically connected to the second connection electrode CNE2 through a third contact hole CH3 defined in the seventh insulating layer INS7. A pixel defining layer PDL exposing a portion of the first electrode AE may be disposed on the first electrode AE and the seventh insulating layer INS7. An opening PX_OP exposing a portion of the first electrode AE may be defined in the pixel defining layer PDL.

The hole control layer HCL may be disposed on the first electrode AE and the pixel defining layer PDL. The hole control layer HCL may be disposed in common in the emission area LEA and the non-emission area NLEA. The hole control layer HCL may include a hole transport layer and a hole injection layer.

The light emitting layer EML may be disposed on the hole control layer HCL. The light emitting layer EML may be disposed in an area corresponding to the opening PX_OP. The light emitting layer EML may include an organic material and/or an inorganic material. The light emitting layer EML may generate one of red light, green light, and blue light.

The electron control layer ECL may be disposed on the light emitting layer EML and the hole control layer HCL. The electron control layer ECL may be disposed in common in the emission area LEA and the non-emission area NLEA. The electron control layer ECL may include an electron transport layer and an electron injection layer. The second electrode CE may be disposed on the electron control layer ECL. The second electrode CE may be disposed in the pixels PX in common.

Layers from the buffer layer BFL to the seventh insulating layer INS7 may be defined as a circuit element layer DP-CL. Layers on which the light emitting element OLED is disposed may be defined as a display element layer DP-OLED.

The thin film encapsulation layer TFE may be disposed on the light emitting element OLED. The thin film encapsulation layer TFE may include an inorganic layer, an organic layer, and an inorganic layer that are sequentially stacked. The inorganic layers may include an inorganic material and may protect the pixels PX from moisture or oxygen. The organic layer may include an organic material and may protect the pixels PX from foreign objects such as dust particles or the like.

The first voltage ELVDD may be applied to the first electrode AE, and the second voltage ELVSS having a lower level than the first voltage ELVDD may be applied to the second electrode CE. Excitons may be formed by coupling holes and electrons injected into the light emitting layer EML. As the excitons transition to a ground state, the light emitting element OLED may emit light. The light emitting element OLED may emit light to display an image.

The display area DA may include a light receiving area LRA corresponding to the sensor SNij and the non-emission area NLEA adjacent to the light receiving area LRA. The light receiving element LRE may include the first electrode AE, the second electrode CE, the hole control layer HCL, the electron control layer ECL, and a light receiving layer OPD. The light receiving layer OPD may be an organic photodiode.

The first electrode AE, the second electrode CE, the hole control layer HCL, and the electron control layer ECL of the sensor SNij may be substantially the same as the first electrode AE, the second electrode CE, the hole control layer HCL, and the electron control layer ECL of the pixel PXij. The light receiving layer OPD of the sensor SNij may be positioned at a location where the light emitting layer EML is positioned in the pixel PXij.

The first transistor T1' may include a source electrode S', a drain electrode D', an active A', and a gate electrode G'. The stacked structure of the first transistor T1' and a stacked structure of the sixth transistor T6 may be substantially the same, and thus the description thereof will be omitted to avoid redundancy.

A connection electrode CNE' may include a first connection electrode CNE1' and a second connection electrode CNE2'. The first connection electrode CNE1' and the first connection electrode CNE1 may be disposed on a same layer, and the second connection electrode CNE2' and the second connection electrode CNE2 may be disposed on a same layer.

The first connection electrode CNE1' may be connected to the gate electrode G' of the first transistor T1' through a first contact hole CH1' defined in the second to fifth insulating layers INS2 to INS5. The second connection electrode CNE2' may be connected to the first connection electrode CNE1' through a second contact hole CH2' defined in the sixth insulating layer INS6. The first electrode AE of the light receiving element LRE may be connected to the second connection electrode CNE2' through a third contact hole CH3' defined in the seventh insulating layer INS7.

Figure 9:
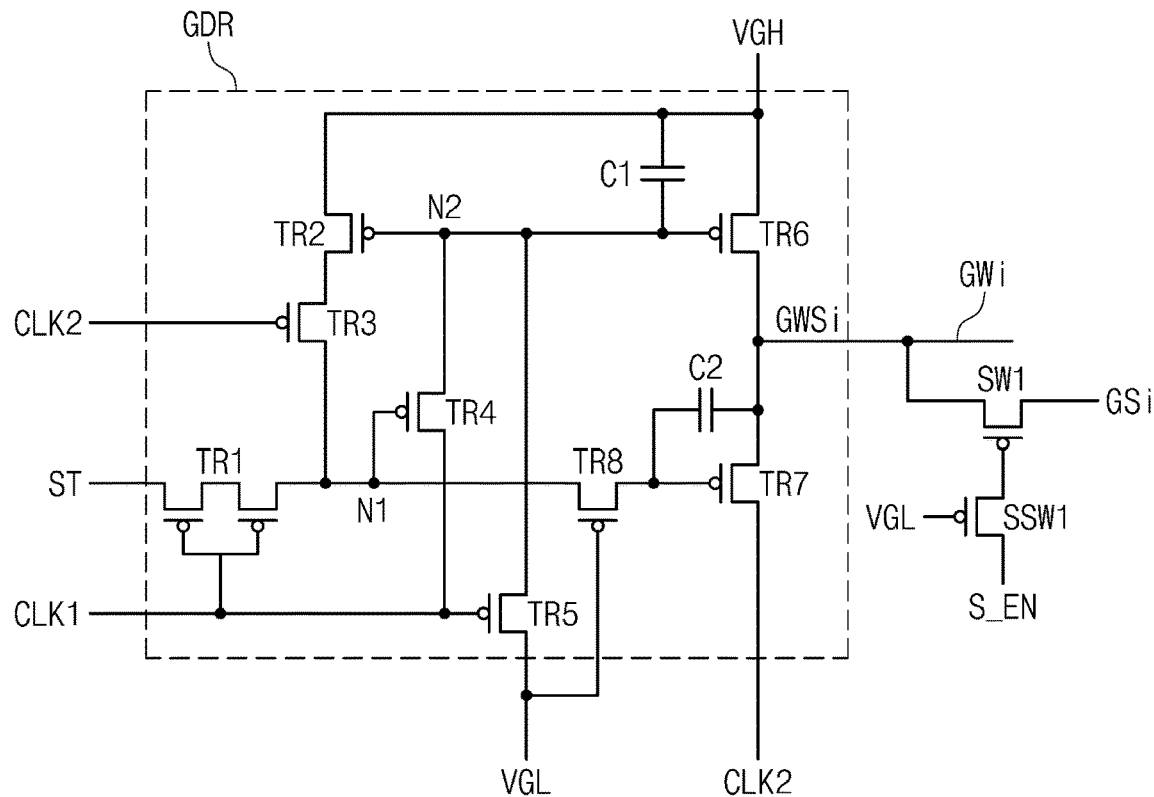
FIG. 9 is a schematic diagram of an equivalent circuit of a write scan circuit for generating a write scan signal, according to an embodiment of the disclosure.

FIG. 9 is a schematic diagram of an equivalent circuit of a write scan circuit for generating a write scan signal, according to an embodiment of the disclosure.

Referring to FIG. 9, a write scan circuit GDR may include first to eighth transistors TR1 to TR8 and first and second capacitors C1 and C2. The first to eighth transistors TR1 to TR8 may be PMOS transistors.

The first transistor TR1 may include a control electrode receiving a first clock signal CLK1, a first electrode receiving a start signal ST, and a second electrode connected to a first node N1. The second transistor TR2 may include a control electrode connected to a second node N2, a first electrode receiving a first voltage VGH, and a second electrode.

The third transistor TR3 may include a control electrode receiving a second clock signal CLK2, which is obtained by inverting the first clock signal CLK1, a first electrode connected to the second electrode of the second transistor TR2, and a second electrode connected to the first node N1. The fourth transistor TR4 may include a control electrode connected to the first node N1, a first electrode connected to the second node N2, and a second electrode receiving the first clock signal CLK1.

The fifth transistor TR5 may include a control electrode receiving the first clock signal CLK1, a first electrode connected to the second node N2, and a second electrode receiving a second voltage VGL having a lower level than the first voltage VGH. The sixth transistor TR6 may include a first electrode receiving the first voltage VGH, a control electrode connected to the second node N2, and a second electrode connected to an output terminal.

The seventh transistor TR7 may include a first electrode connected to the output terminal, a second electrode receiving the second clock signal CLK2, and a control electrode. The eighth transistor TR8 may include a control electrode receiving the second voltage VGL, a first electrode connected to the first node N1, and a second electrode connected to the control electrode of the seventh transistor TR7.

The first capacitor C1 may be connected between the control electrode of the sixth transistor TR6 and the first electrode of the second transistor TR2. The second capacitor C2 may be connected between the first electrode of the seventh transistor TR7 and the control electrode of the seventh transistor TR7.

The write scan circuit GDR may generate and output the write scan signal GWSi according to operations of the first to eighth transistors TR1 to TR8 and the first and second capacitors C1 and C2. The write scan signal GWSi may be the write scan signal GWSi shown in FIG. 5.

The output terminal of the write scan circuit GDR may be connected to the write scan line GWi. A first switching element SW1 may be connected in parallel to the output terminal of the write scan circuit GDR. A first control switching element SSW1 may be connected to the first switching element SW1.

The first switching element SW1 may include a control electrode connected to the first control switching element SSW1, a first electrode connected to the output terminal of the write scan circuit GDR, and a second electrode outputting the write scan signal GWSi as a sensing scan signal GSi.

The first control switching element SSW1 may include a first electrode receiving a first control signal S_EN, a control electrode receiving the second voltage VGL, and a second electrode connected to the control electrode of the first switching element SW1. Operations of the first switching element SW1 and the first control switching element SSW1 will be described in detail below.

Figure 10:
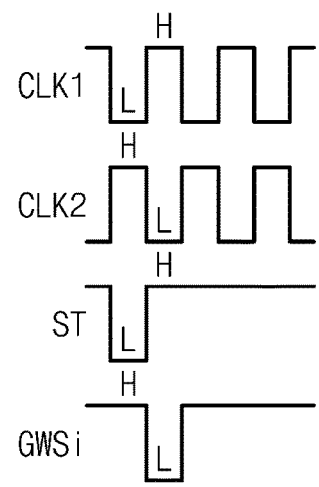
FIG. 10 is a schematic timing diagram of signals for describing an operation of the write scan circuit shown in FIG. 9.

FIG. 10 is a schematic timing diagram of signals for describing an operation of the write scan circuit shown in FIG. 9.

Referring to FIGS. 9 and 10, the first clock signal CLK1, the second clock signal CLK2, and the start signal ST may be applied to the write scan circuit GDR. The second clock signal CLK2 may be a clock signal obtained by inverting the first clock signal CLK1. The start signal ST having a low level L may be a signal synchronized with a low level L of the first clock signal CLK1.

Hereinafter, operations of transistors related to an operation of generating the write scan signal GWSi depending on the first clock signal CLK1, the second clock signal CLK2, and the start signal ST will be schematically described.

The first clock signal CLK1 of the low level L and the start signal ST of the low level L may be applied to the write scan circuit GDR. The first and fifth transistors TR1 and TR5 may be turned on by the first clock signal CLK1 of the low level L. The start signal ST of the low level L may be applied to the first node N1 through the turned-on first transistor TR1. Accordingly, a voltage of the first node N1 may have a low level L, and the fourth transistor TR4 may be turned on in response to the voltage having the low level L of the first node N1.

The first clock signal CLK1 of the low level L may be applied to the second node N2 through the turned-on fourth transistor TR4. The second voltage VGL having the low level L may be applied to the second node N2 through the turned-on fifth transistor TR5. A voltage of the second node N2 may have a low level L. The sixth transistor TR6 may be turned on in response to the voltage having the low level L of the second node N2.

The first voltage VGH may be output to the output terminal through the turned-on sixth transistor TR6. Because the first voltage VGH actually has a high level H, the write scan signal GWSi may have a high level H in case that the first clock signal CLK1 of the low level L and the start signal ST of the low level L are applied to the write scan circuit GDR.

The eighth transistor TR8 may be turned on by the second voltage VGL having the low level L. The voltage having the low level L of the first node N1 may be applied to the control electrode of the seventh transistor TR7 through the eighth transistor TR8, and thus the seventh transistor TR7 may be turned on.

In case that the first clock signal CLK1 of the low level L and the start signal ST of the low level L are applied to the write scan circuit GDR, the second clock signal CLK2 of a high level H may be applied to the write scan circuit GDR. The second clock signal CLK2 of the high level H may be applied to the output terminal through the turned-on seventh transistor TR7.

At a next timing, the start signal ST may have a high level H, the first clock signal CLK1 may have a high level H, and the second clock signal CLK2 may have a low level L.

The second clock signal CLK2 of the low level L may be provided to the output terminal through the seventh transistor TR7. The second clock signal CLK2 of the low level L may be output as the write scan signal GWSi having the low level L through the output terminal. The write scan signal GWSi may be a signal synchronized with the second clock signal CLK2 of the low level L.

The first clock signal CLK1 having the high level H may be provided to the second node N2 through the fourth transistor TR4 to turn off the sixth transistor TR6. Accordingly, the first voltage VGH may not be provided to the output terminal.

The write scan signal GWSi may be used as the sensing scan signal GSi shown in FIG. 5, and the operation will be described in detail below.

Figure 11:
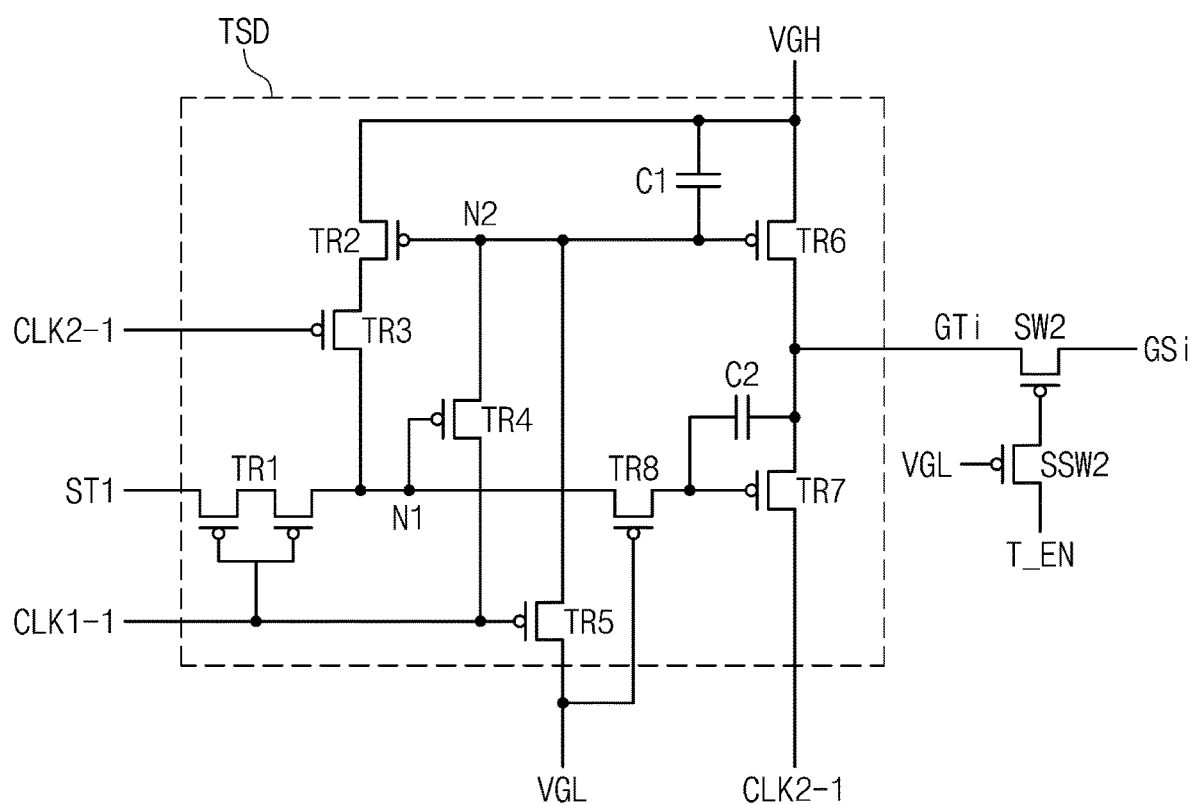
FIG. 11 is a schematic diagram of an equivalent circuit of a touch sensing circuit for generating a touch sensing signal, according to an embodiment of the disclosure.

FIG. 11 is a schematic diagram of an equivalent circuit of a touch sensing circuit for generating a touch sensing signal, according to an embodiment of the disclosure.

Referring to FIG. 11, a touch sensing circuit TSD may include first to eighth transistors TR1 to TR8 and first and second capacitors C1 and C2. A connection configuration of the first to eighth transistors TR1 to TR8 and the first and second capacitors C1 and C2 of the touch sensing circuit TSD may be substantially the same as a connection configuration of the first to eighth transistors TR1 to TR8 and the first and second capacitors C1 and C2 of the write scan circuit GDR shown in FIG. 9.

The write scan circuit GDR and the touch sensing circuit TSD may have substantially a same circuit configuration. Accordingly, a description of the connection configuration of the first to eighth transistors TR1 to TR8 and the first and second capacitors C1 and C2 of the touch sensing circuit TSD is omitted to avoid redundancy.

According to operations of the first to eighth transistors TR1 to TR8 and the first and second capacitors C1 and C2, the touch sensing circuit TSD may generate and output a touch sensing signal GTi. The touch sensing signal GTi may be output as the sensing scan signal GSi shown in FIG. 5, and the operation will be described in detail below.

A second switching element SW2 may be serially connected to an output terminal of the touch sensing circuit TSD. A second control switching element SSW2 may be connected to the second switching element SW2. The second switching element SW2 may include a control electrode connected to the second control switching element SSW2, a first electrode connected to the output terminal of the touch sensing circuit TSD, and a second electrode outputting the touch sensing signal GTi as the sensing scan signal GSi.

The second control switching element SSW2 may include a first electrode receiving a second control signal T_EN, a control electrode receiving the second voltage VGL, and a second electrode connected to the control electrode of the second switching element SW2. Operations of the second switching element SW2 and the second control switching element SSW2 will be described in detail below.

The touch sensing circuit TSD may receive a first clock signal CLK1-1, a second clock signal CLK2-1, and a start signal ST1, and may generate the touch sensing signal GTi. The first clock signal CLK1-1, the second clock signal CLK2-1, and the start signal ST1 may substantially correspond to the first clock signal CLK1, the second clock signal CLK2, and the start signal ST shown in FIGS. 9 and 10, respectively.

However, frequencies of the first clock signal CLK1-1, the second clock signal CLK2-1, and the start signal ST1 may be greater than frequencies of the first clock signal CLK1, the second clock signal CLK2, and the start signal ST. An operating frequency of the touch sensing circuit TSD may be greater than an operating frequency of the write scan circuit GDR.

The operating frequency of the touch sensing circuit TSD may be about 240 Hz. The operating frequency of the write scan circuit GDR may be about 120 Hz. In case that the write scan signal GWSi is generated once in a frame, the touch sensing signal GTi may be generated twice in the frame.

Figure 12:
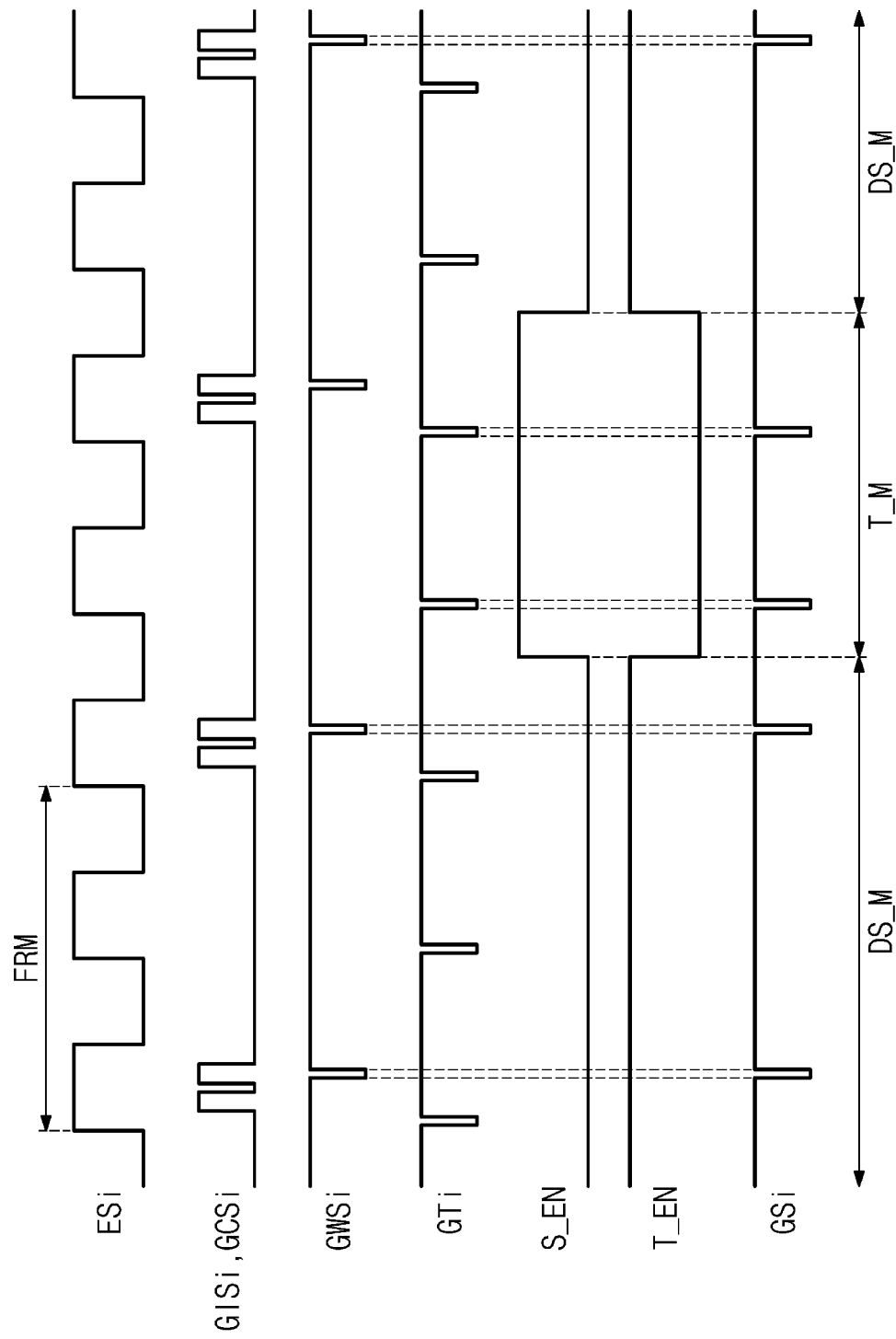
FIG. 12 is a schematic timing diagram for describing operations of the pixel shown in FIG. 5, the write scan circuit shown in FIG. 9, and the touch sensing circuit shown in FIG. 11.

FIG. 12 is a schematic timing diagram for describing operations of the pixel shown in FIG. 5, the write scan circuit shown in FIG. 9, and the touch sensing circuit shown in FIG. 11.

The write scan signal GWSi, the compensation scan signal GCSi, the initialization scan signal GISi, the emission signal ESi, the touch sensing signal GTi, and the sensing scan signal GSi shown in FIG. 12 are described above. Accordingly, operations of the write scan circuit GDR and the touch sensing circuit TSD according to the first and second control signals S_EN and T_EN will be schematically described below.

Referring to FIGS. 5 and 12, the write scan signal GWSi, the compensation scan signal GCSi, the initialization scan signal GISi, and the emission signal ESi may be applied to the pixel PXij such that light is generated in the pixel PXij. As a result, an image may be displayed.

Referring to FIGS. 9, 11, and 12, a period in which the first control signal S_EN is activated at the low level L may be defined as a period in which a first sensing mode DS_M is operated. A period in which the second control signal T_EN is activated at the low level L may be defined as a period in which a second sensing mode T_M is operated.

In case that the first control signal S_EN is activated, the second control signal T_EN may be deactivated with the high level H. In case that the second control signal T_EN is activated, the first control signal S_EN may be deactivated with the high level H. The first control signal S_EN may be a signal obtained by inverting the second control signal T_EN.

The first switching element SW1 may be controlled by the first control signal S_EN. The second switching element SW2 may be controlled by the second control signal T_EN. Each of the first control switching element SSW1 and the second control switching element SSW2 may receive the second voltage VGL and maintain a turn-on state.

During the first sensing mode DS_M, the activated first control signal S_EN may be applied to the first switching element SW1 through the turned-on first control switching element SSW1. During the first sensing mode DS_M, the deactivated second control signal T_EN may be applied to the second switching element SW2 through the turned-on second control switching element SSW2.

During the first sensing mode DS_M, the first switching element SW1 may be turned on by the activated first control signal S_EN. During the first sensing mode DS_M, the second switching element SW2 may be turned off by the deactivated second control signal T_EN.

The write scan signal GWSi applied to the pixel PXij may be output as the sensing scan signal GSi through the turned-on first switching element SW1. Accordingly, during the first sensing mode DS_M, the write scan signal GWSi may be used as the sensing scan signal GSi. Because the second switching element SW2 is turned off, the touch sensing signal GTi generated by the touch sensing circuit TSD may not be output as the sensing scan signal GSi.

The first sensing mode DS_M and the second sensing mode T_M may be defined as operating modes that do not overlap with each other. During the second sensing mode T_M, the deactivated first control signal S_EN may be applied to the first switching element SW1 through the turned-on first control switching element SSW1. During the second sensing mode T_M, the activated second control signal T_EN may be applied to the second switching element SW2 through the turned-on second control switching element SSW2.

During the second sensing mode T_M, the first switching element SW1 may be turned off by the deactivated first control signal S_EN. During the second sensing mode T_M, the second switching element SW2 may be turned on by the activated second control signal T_EN.

The write scan signal GWSi applied to the pixel PXij may not be output as the sensing scan signal GSi because the first switching element SW1 is turned off. The touch sensing signal GTi generated by the touch sensing circuit TSD may be output as the sensing scan signal GSi through the turned-on second switching element SW2.

The operating frequency of the touch sensing circuit TSD may be greater than the operating frequency of the write scan circuit GDR, and thus the touch sensing signal GTi may be generated more often than the write scan signal GWSi. Accordingly, the touch sensing signal GTi generated frequently in the second sensing mode T_M may be output as the sensing scan signal GSi. An operating frequency of the second sensing mode T_M may be greater than the operating frequency of the first sensing mode DS_M.

Figure 13A:
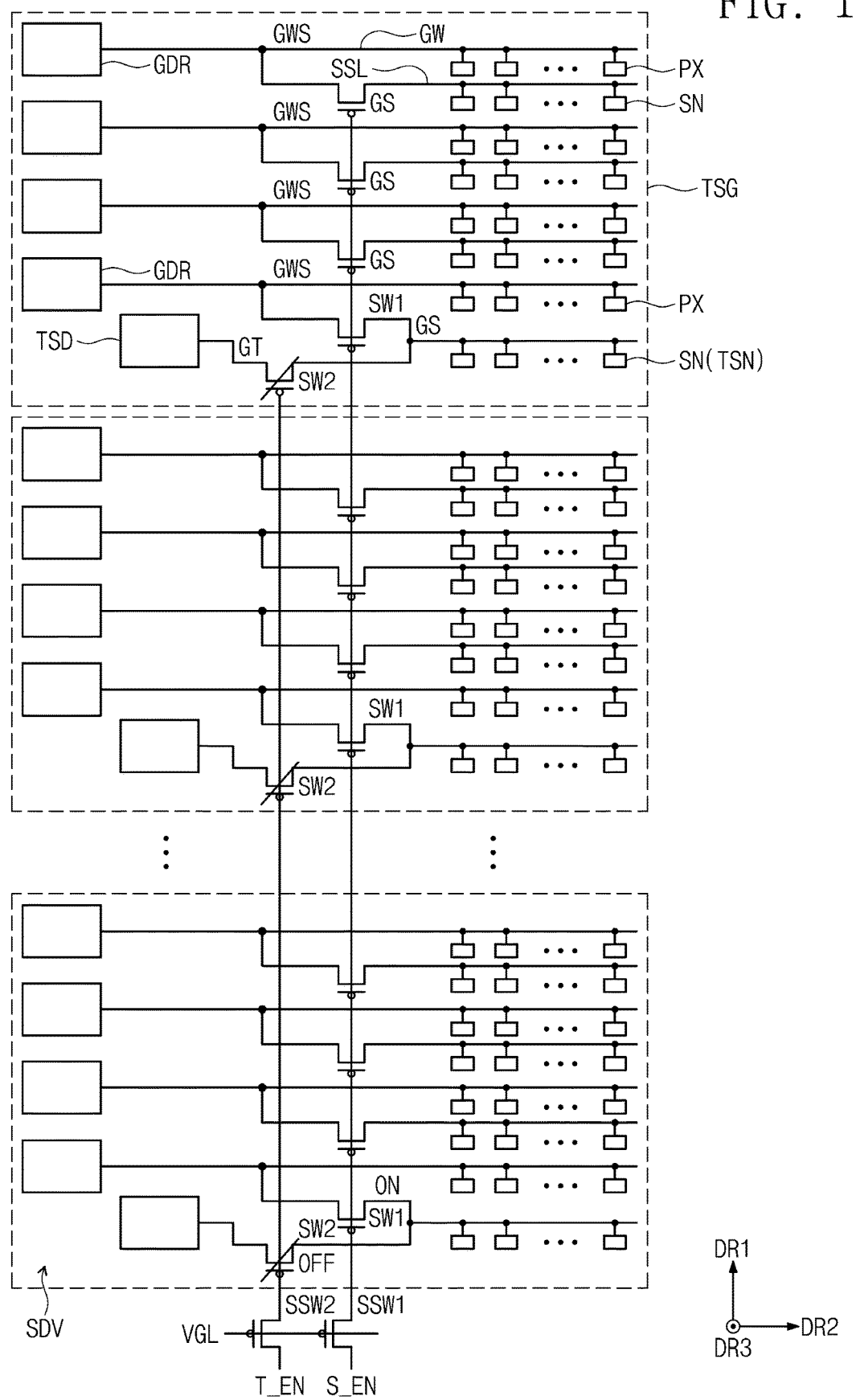
FIGS. 13A and 13B are schematic diagrams illustrating a connection relationship between pixels, sensors, and a scan driver including the write scan circuit shown in FIG. 9 and the touch sensing circuit shown in FIG. 11.
Figure 13B:
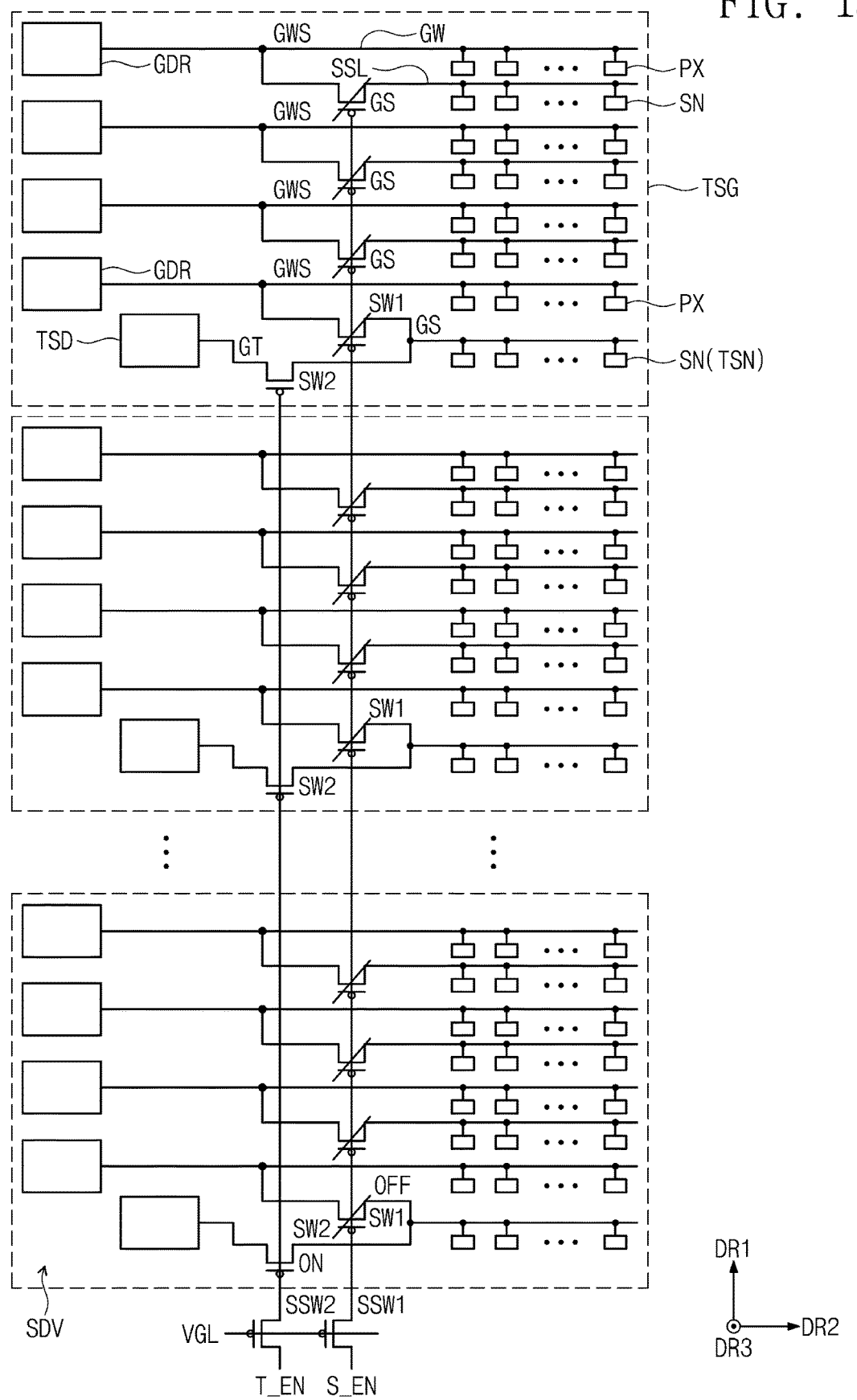

FIGS. 13A and 13B are schematic diagrams illustrating a connection relationship between pixels, sensors, and a scan driver including the write scan circuit shown in FIG. 9 and the touch sensing circuit shown in FIG. 11.

Referring to FIGS. 9, 11, 13A, and 13B, the scan driver SDV may include multiple write scan circuits GDR and multiple touch sensing circuits TSD. The write scan circuits GDR and the touch sensing circuits TSD may be connected to pixels PX and sensors SN. For convenience of description, in FIGS. 13A and 13B, the pixels PX, the sensors SN, and signals GWS, GS, and GT are marked by same reference signs without using a variable 'i' as before.

The display panel DP shown in FIG. 4 may include multiple touch sensing groups TSG in FIGS. 13A and 13B. Each of the touch sensing groups TSG may include the write scan circuits GDR, the touch sensing circuit TSD, the pixels PX, the sensors SN, the first switching elements SW1, and the second switching element SW2.

The touch sensing groups TSG may have a same configuration as one another, and thus a configuration of one touch sensing group TSG will be described below. Hereinafter, a row may correspond to the second direction DR2, and a column may correspond to the first direction DR1. The write scan circuits GDR may be arranged in the first direction DR1. The pixels PX may be arranged in multiple rows, and the sensors SN may be arranged in multiple rows.

The pixels PX may be connected to the write scan circuit GDR in each row. The pixels PX may be connected to the write scan line GW in each row, and may be connected to the write scan circuit GDR through the write scan line GW.

The sensors SN may be connected to the write scan circuit GDR in each row through the first switching element SW1. The first switching elements SW1 and the write scan lines GW may be connected in parallel to the write scan circuits GDR. The sensors SN may be connected to the sensing scan line SSL in each row, and may be connected to the first switching elements SW1 through sensing scan line SSL. The first switching elements SW1 may switch connections between the sensors SN and the write scan circuits GDR.

The control electrodes of the first switching elements SW1 may be commonly connected to the first control switching element SSW1. The first electrodes of the first switching elements SW1 may each be connected to output terminals of the write scan circuits GDR. The second electrodes of the first switching elements SW1 may be connected to the pixels PX.

The touch sensing circuit TSD may be arranged adjacent to a h-th write scan circuit GDR. 'h' may be a natural number. For example, in FIGS. 13A and 13B, the h-th write scan circuit GDR may be the last write scan circuit GDR.

The touch sensing circuit TSD may be connected to sensors TSN defined as the sensors SN connected to the h-th write scan circuit GDR. For example, the touch sensing circuit TSD may be connected to the last sensing scan line SSL through the second switching element SW2, and may be connected to the touch sensors TSN through the last sensing scan line SSL. The second switching element SW2 may switch the connection between the touch sensing circuit TSD and the touch sensors TSN.

The control electrode of the second switching element SW2 may be connected to the second control switching element SSW2. The first electrode of the second switching element SW2 may be connected to the output terminal of the touch sensing circuit TSD, and the second electrode of the second switching element SW2 may be connected to the touch sensors TSN.

The first switching elements SW1 of the touch sensing groups TSG may be commonly connected to the first control switching element SSW1. The second switching elements SW2 of the touch sensing groups TSG may be commonly connected to the second control switching element SSW2.

The operations of the write scan circuits GDR and the touch sensing circuits TSD shown in FIGS. 13A and 13B will be described with reference to the operation described in FIG. 12 as follows. For example, an operation of one touch sensing group TSG will be described.

Referring to FIGS. 12 and 13A, during the first sensing mode DS_M, the write scan signals GWS generated by the write scan circuits GDR may be applied to the pixels PX. The pixels PX may display an image in response to the write scan signals GWS during the first sensing mode DS_M.

During the first sensing mode DS_M, the first switching elements SW1 may be turned on, and the second switching element SW2 may be turned off. The write scan signals GWS may be applied to the sensors SN as the sensing scan signals GS output through the turned-on first switching elements SW1. The sensors SN may be driven by the sensing scan signals GS. The second switching element SW2 may be turned off during the first sensing mode DS_M, and thus the touch sensing signal GT may not be provided to the touch sensors TSN.

During the first sensing mode DS_M, the sensors SN may sense a fingerprint. For example, the sensors SN may detect a fingerprint of a finger provided on the display panel DP. Light generated by the light emitting elements OLED of the pixels PX may be provided to the fingerprint and may be reflected from the fingerprint. The light reflected from the fingerprint may be sensed by being provided to the light receiving elements LRE of the sensors SN.

During the first sensing mode DS_M, a control module (not shown) of the display device DD may receive fingerprint information detected by the sensor SN, and may perform a user authentication mode by using the received fingerprint information.

Referring to FIGS. 12 and 13B, during the second sensing mode T_M, the write scan signals GWS generated by the write scan circuits GDR may be applied to the pixels PX. The pixels PX may display an image in response to the write scan signals GWS during the second sensing mode T_M.

During the second sensing mode T_M, the first switching elements SW1 may be turned off, and the second switching element SW2 may be turned on. The first switching elements SW1 may be turned off, and thus the write scan signals GWS may not be applied to the sensors SN. The touch sensing signal GT may be a sensing scan signal GS output through the turned-on second switching element SW2 and may be applied to the touch sensors TSN.

During the second sensing mode T_M, the touch sensors TSN may sense a user's touch. In case that the user touches the display device DD, the light generated by the light emitting elements OLED may be reflected from a user's touch portion, and thus the user's touch may be sensed. During the second sensing mode T_M, a control module (not shown) of the display device DD may calculate a user's touch location by receiving touch information detected by the sensor SN.

The configuration of the touch sensing circuit TSD connected to the sensors SN connected to the last write scan circuit GDR is described, but the disclosure is not limited thereto. For example, in case that 'h' is 1 in the h-th write scan circuit GDR, the touch sensing circuit TSD may be connected to the sensors SN connected to the first write scan circuit GDR. For example, in case that 'h' is 2, the touch sensing circuit TSD may be connected to the sensors SN connected to the second write scan circuit GDR. For example, in case that 'h' is 3, the touch sensing circuit TSD may be connected to the sensors SN connected to the third write scan circuit GDR.

Figure 14A:
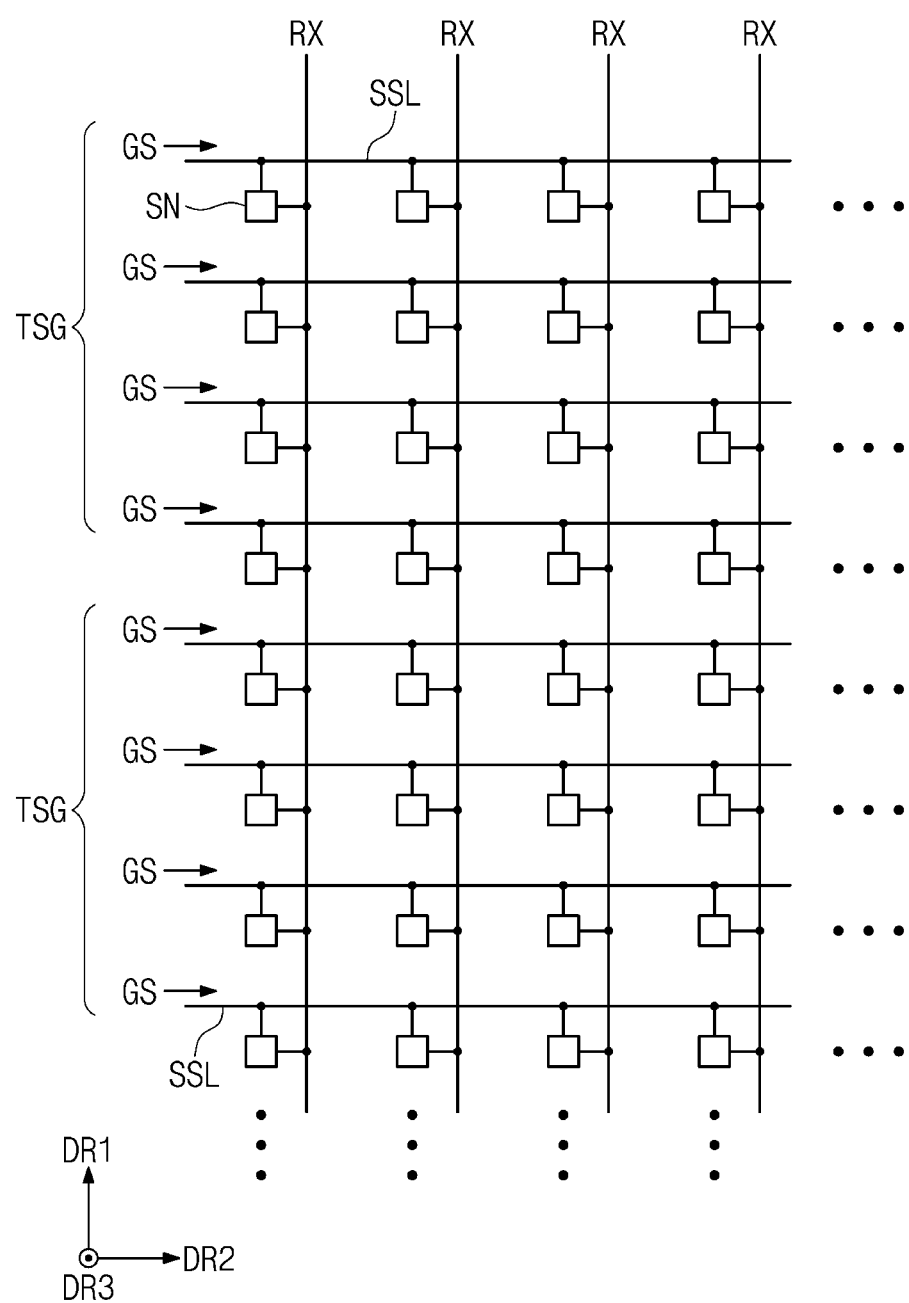
FIG. 14A is a schematic diagram illustrating sensors driven depending on the operation shown in FIG. 13A.

FIG. 14A is a schematic diagram illustrating sensors driven depending on the operation shown in FIG. 13A. FIG.

14B is a schematic diagram illustrating sensors driven depending on the operation shown in FIG. 13B.

Figure 14B:
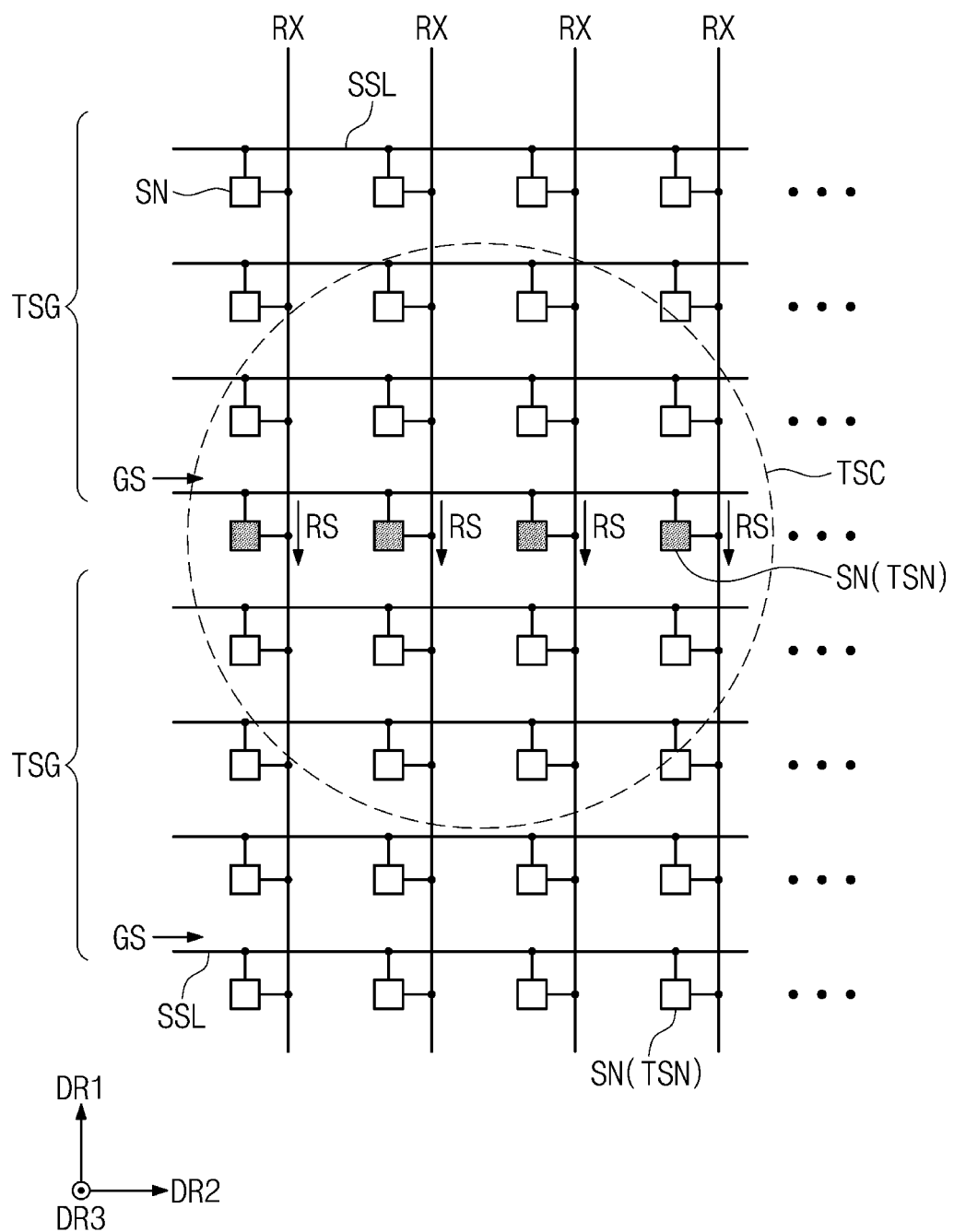
FIG. 14B is a schematic diagram illustrating sensors driven depending on the operation shown in FIG. 13B.

FIGS. 14A and 14B show sensors SN arranged in the two touch sensing groups TSG.

Referring to FIG. 14A, the sensors SN may be driven by applying the sensing scan signals GS to the sensors SN of the touch sensing groups TSG. In a fingerprint, feature points (e.g., a portion where a fingerprint line is disconnected, a portion where fingerprint lines are intersected with each other, and a portion forming closed curves in fingerprint lines) of fine fingerprint lines of a finger need to be sensed, and thus the fingerprint may be normally sensed only in case that all the sensors SN are driven.

Referring to FIG. 14B, the sensing scan signals GS may be applied to the sensors SN connected to the sensing scan line SSL connected to the touch sensing circuit TSD in each of the touch sensing groups TSG. In case that a user's finger is touched, an area of a touch portion TSC may overlap the sensors SN.

Merely a location of the touch portion TSC needs to be sensed, and thus the user's touch location may be sufficiently sensed even in case that merely some of the sensors SN perform a sensing operation in an area of the touch portion TSC of the user. Accordingly, all the sensors SN in each of the touch sensing groups TSG need not be driven. Even in case that some of the sensors SN are driven as the touch sensors TSN, the user's touch location may be sensed.

The four sensors SN of the first touch sensing group TSG may sense the user's touch depending on the user's touch. The sensing signals RS sensed by the four sensors SN may be output through four reception lines RX, and thus the user's touch location may be calculated.

In an embodiment of the disclosure, the sensors SN may be embedded in the display panel DP, and the write scan circuits GDR and the touch sensing circuits TSD may drive the sensors SN. Accordingly, fingerprint sensing and touch sensing operations may be performed. Accordingly, a separate touch panel and a separate fingerprint sensing module may not be required, and thus the thickness of the display device DD may be reduced.

Figure 15:
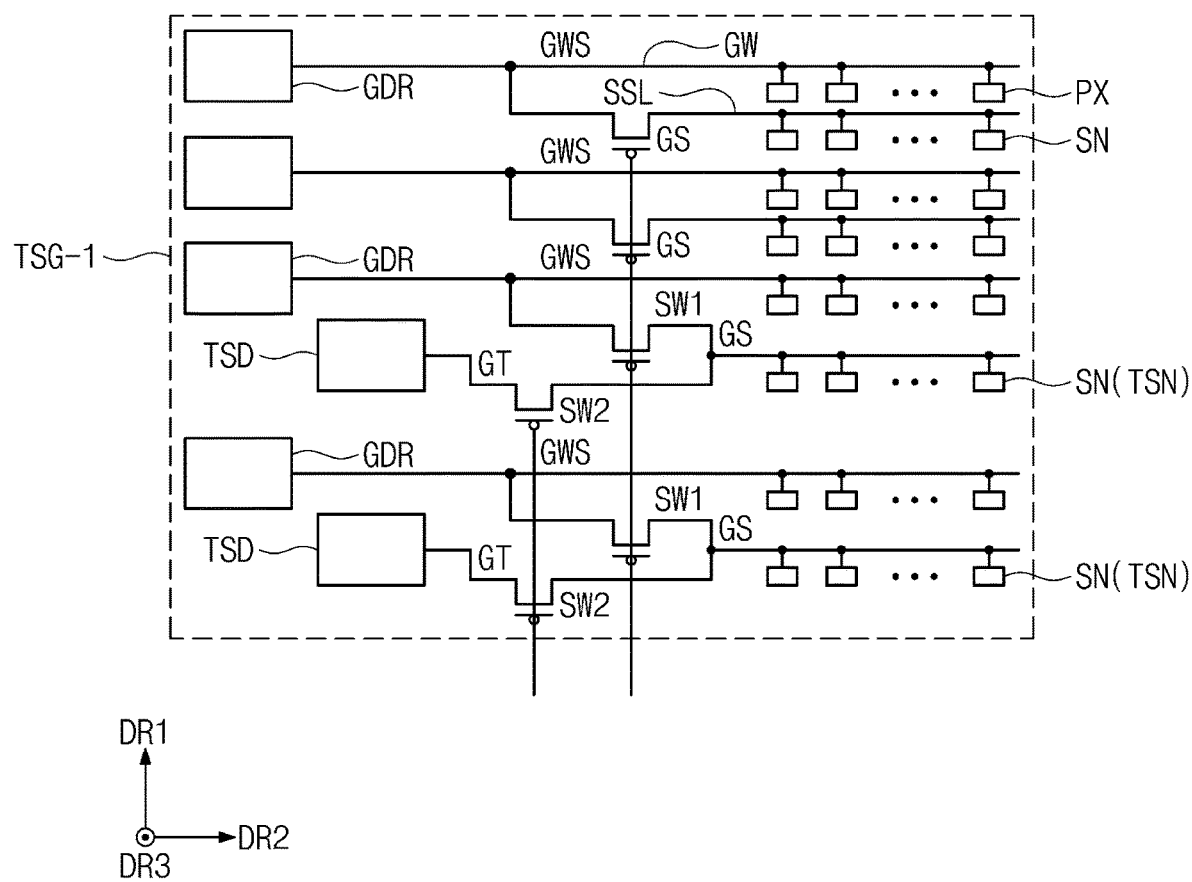
FIG. 15 is a schematic diagram showing a configuration of a touch sensing group, according to an embodiment of the disclosure.

FIG. 15 is a schematic diagram showing a configuration of a touch sensing group, according to an embodiment of the disclosure.

Hereinafter, a configuration of a touch sensing group TSG-1 shown in FIG. 15 will be described with a configuration different from the configuration of the touch sensing group TSG shown in FIG. 13A. One touch sensing group TSG-1 is shown in FIG. 15, but the multiple touch sensing groups TSG-1 may be substantially provided to the display panel DP similarly to an illustration in FIG. 13A.

Referring to FIG. 15, at least two touch sensing circuits TSD may be provided in the touch sensing group TSG-1. The at least two touch sensing circuits TSD may be connected to the touch sensors TSN, which are the sensors SN connected to at least two write scan circuits GDR.

For example, the two touch sensing circuits TSD may be included in the touch sensing group TSG-1, but the disclosure is not limited thereto. For example, the three or four touch sensing circuits TSD may be included in the touch sensing group TSG-1. In case that three or four touch sensing circuits TSD are included in the touch sensing group TSG-1, the touch sensing circuits TSD may be connected to the sensors SN connected to three or four write scan circuits GDR.

At least two second switching elements SW2 may also be provided. The at least two second switching elements SW2 may switch the connection between the touch sensors TSN connected to the at least two write scan circuits GDR and the at least two touch sensing circuits TSD.

Figure 16:
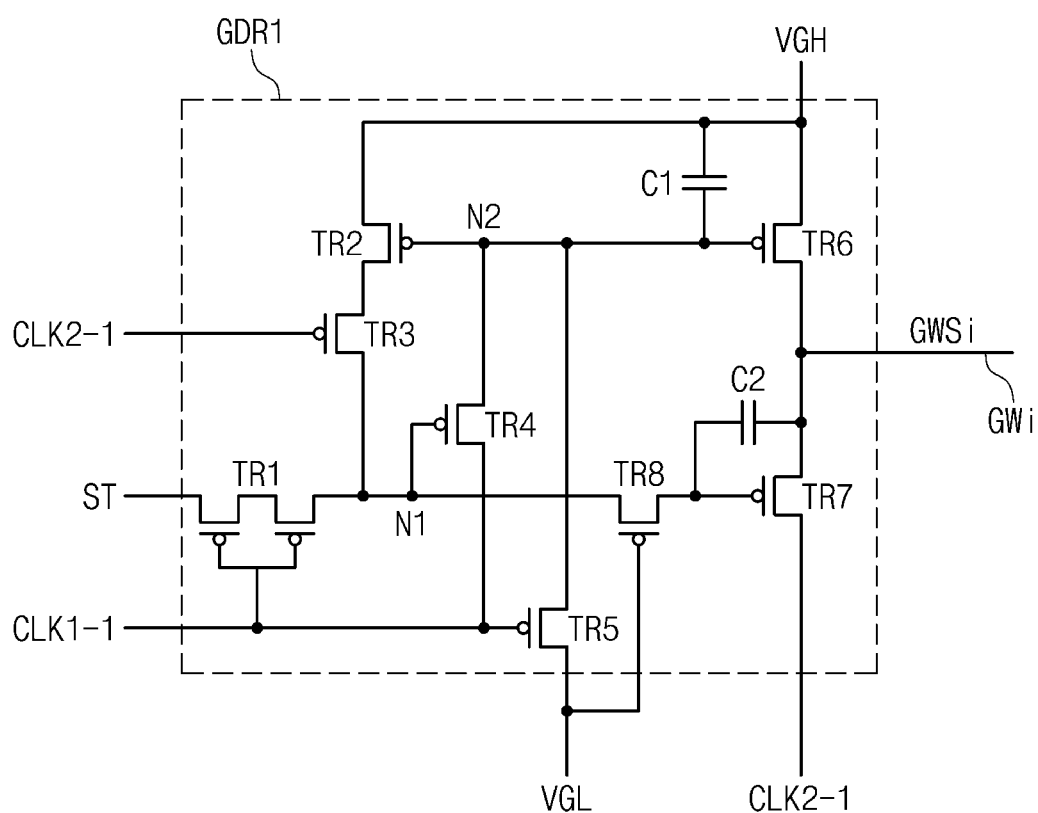
FIG. 16 is a schematic diagram of an equivalent circuit of a first write scan circuit for generating a write scan signal, according to an embodiment of the disclosure.

FIG. 16 is a schematic diagram of an equivalent circuit of a first write scan circuit for generating a write scan signal, according to an embodiment of the disclosure.

Referring to FIG. 16, a first write scan circuit GDR1 may include first to eighth transistors TR1 to TR8 and first and second capacitors C1 and C2. The first write scan circuit GDR1 and the write scan circuit GDR shown in FIG. 9 may have substantially a same circuit configuration, and thus the description of a circuit configuration of the first write scan circuit of GDR1 is omitted to avoid redundancy. However, unlike the write scan circuit GDR shown in FIG. 9, the first switching element SW1 and the first control switching element SSW1 in FIG. 16 may not be connected to an output terminal of the first write scan circuit GDR1.

Figure 17A:
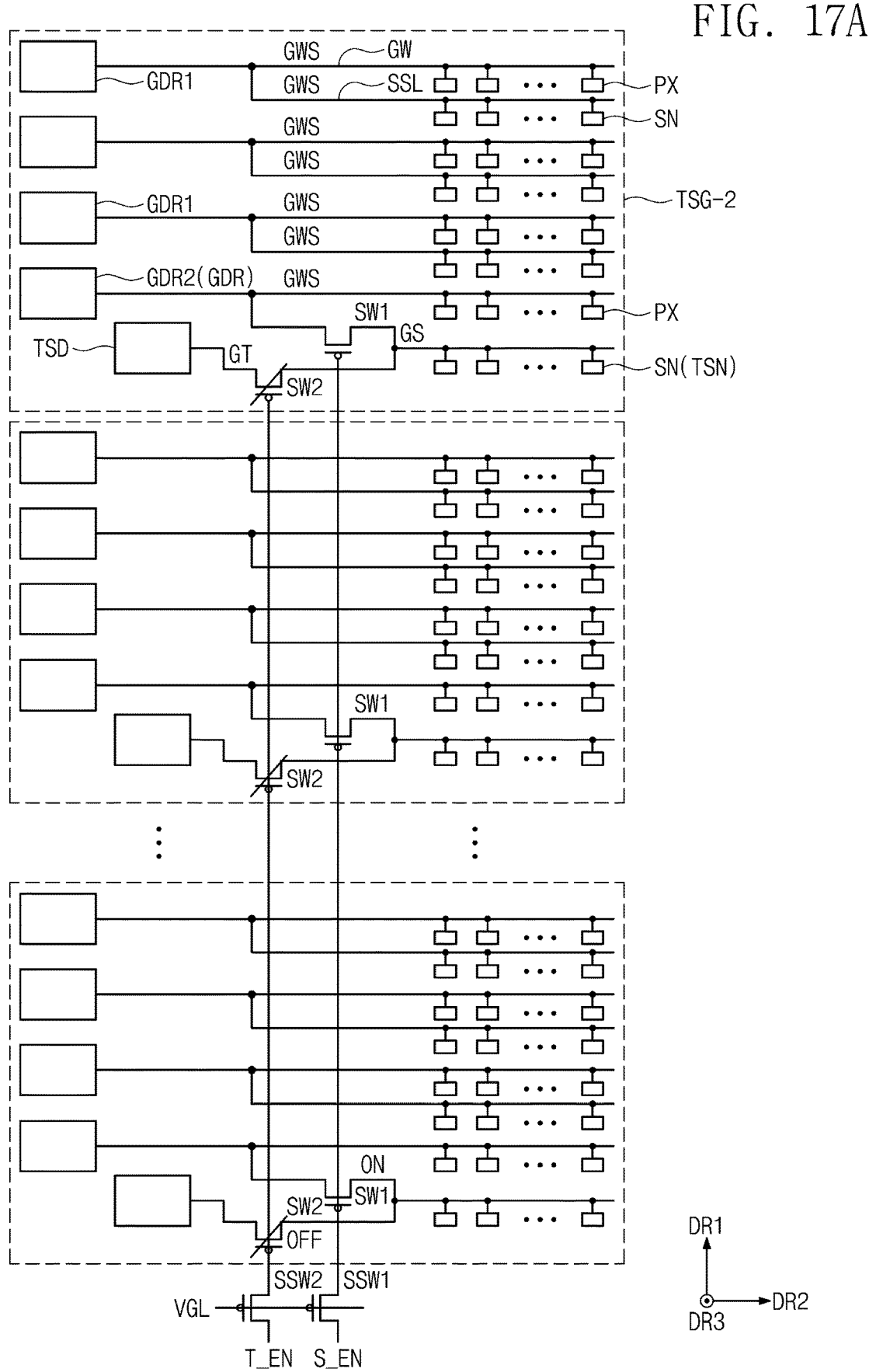
FIGS. 17A and 17B are schematic diagrams showing a configuration of touch sensing groups, according to an embodiment of the disclosure.
Figure 17B:
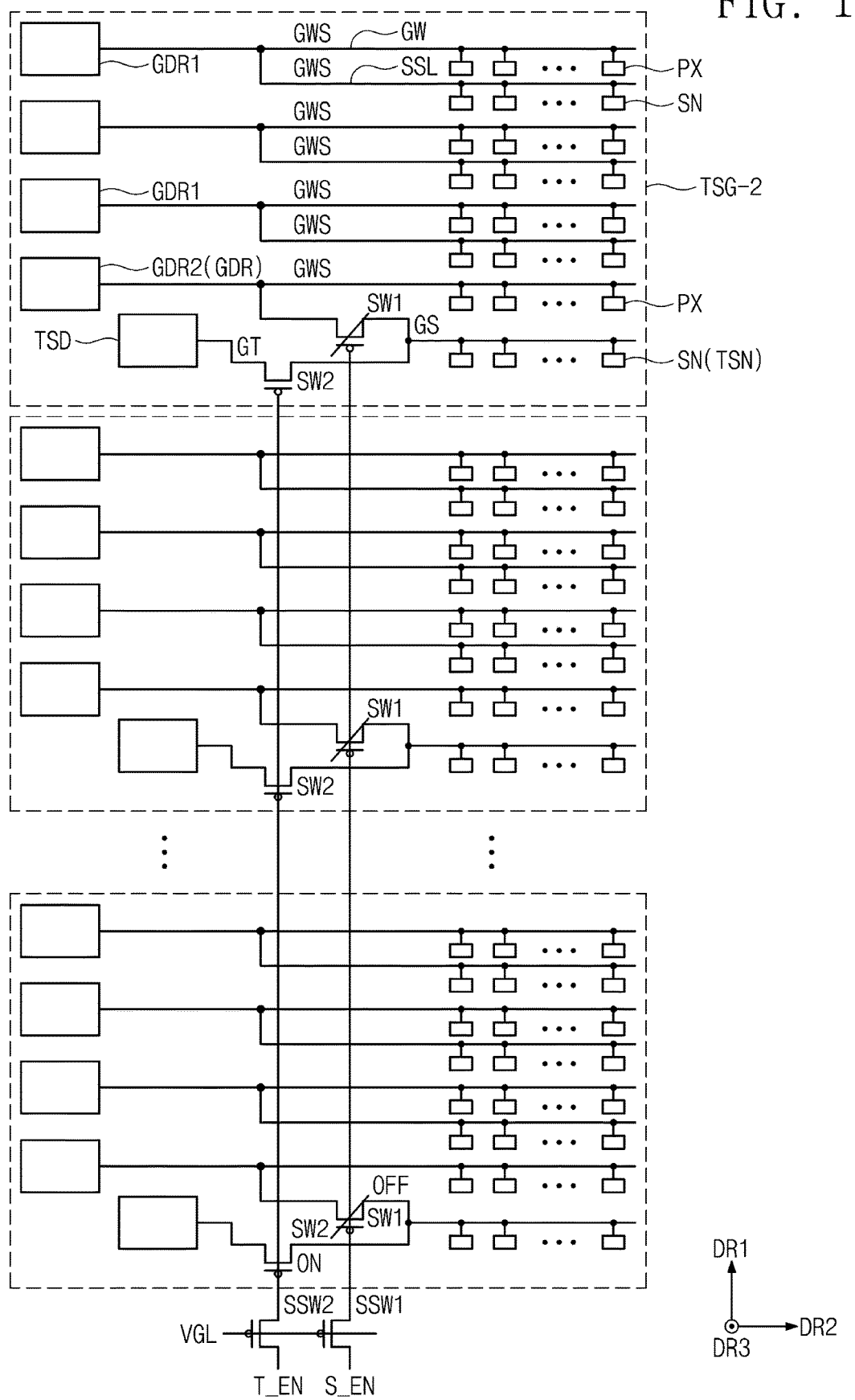

FIGS. 17A and 17B are schematic diagrams showing a configuration of touch sensing groups, according to an embodiment of the disclosure.

Hereinafter, a configuration of a touch sensing groups TSG-2 shown in FIGS. 17A and 17B will be described with configurations different from those of FIGS. 13A and 13B.

Referring to FIGS. 17A and 17B, each of the touch sensing groups TSG-2 may include multiple first write scan circuits GDR1, a second write scan circuit GDR2, and the touch sensing circuit TSD. The first write scan circuits GDR1 may be the first write scan circuit GDR1 shown in FIG. 16. The second write scan circuit GDR2 may be the write scan circuit GDR shown in FIG. 9. Accordingly, the second write scan circuit GDR2 may be connected to the first switching element SW1.

Hereinafter, a configuration of one touch sensing group TSG-2 is described.

The first write scan circuits GDR1 and the second write scan circuit GDR2 may be arranged in the first direction DR1. The touch sensing circuit TSD may be disposed adjacent to the second write scan circuit GDR2. The pixels PX may be connected to the first or second write scan circuits GDR1 or GDR2 in each row. The sensors SN may be connected to the first or second write scan circuits GDR1 or GDR2 in each row.

The first switching element SW1 may switch a connection between the touch sensors TSN defined as the sensors SN connected to the second write scan circuit GDR2 and the second write scan circuit GDR2. The touch sensing circuit TSD may be connected to the touch sensors TSN. The second switching element SW2 may switch a connection between the touch sensing circuit TSD and the touch sensors TSN.

A connection configuration of the second write scan circuit GDR2, the touch sensing circuit TSD, the pixels PX, and the sensors SN may be substantially the same as the structures shown in FIGS. 13A and 13B.

The first and second write scan circuits GDR1 and GDR2 may drive the pixels PX by applying the write scan signals GWS to the pixels PX.

Referring to FIG. 17A, during the first sensing mode DS_M, the first switching element SW1 may be turned on, and the second switching element SW2 may be turned off. Accordingly, the write scan signal GWS generated by the second write scan circuit GDR2 may be applied to touch the sensors SN as the sensing scan signal GS output through the turned-on first switching element SW1.

Referring to FIG. 17B, during the second sensing mode T_M, the first switching element SW1 may be turned off, and the second switching element SW2 may be turned on. Accordingly, the touch sensing signal GT generated by the touch sensing circuit TSD may be applied to the touch sensors SN as the sensing scan signal GS output through the turned-on second switching element SW2.

In an embodiment of the disclosure, the sixth and seventh transistors TR6 and TR7 of each of the first write scan circuits GDR1, the sixth and seventh transistors TR6 and TR7 of the second write scan circuit GDR2, and the sixth and seventh transistors TR6 and TR7 of the touch sensing circuit TSD may have different sizes from one another. The first and second switching elements SW1 and SW2 may have different sizes from each other. The first and second control switching elements SSW1 and SSW2 may have different sizes from each other.

The second write scan signal GDR2 and the touch sensing circuit TSD may be connected to the first and second switching elements SW1 and SW2 and the first and second control switching elements SSW1 and SSW2. However, each of the first write scan circuits GDR1 may not be connected to first and second switching elements SW1 and SW2 and the first and second control switching elements SSW1 and SSW2. A load of each of the first write scan circuits GDR1 may be different from a load of each of the second write scan signal GDR2 and the touch sensing circuit TSD.

In an embodiment of the disclosure, to make the load of each of the first write scan circuits GDR1 similarly to the load of each of the second write scan signal GDR2 and the touch sensing circuit TSD, various elements such as resistors and capacitors may be connected to each of the first write scan circuits GDR1.

According to an embodiment of the disclosure, a display panel may include multiple pixels and multiple sensors. Write scan circuits and touch sensing circuits may drive the sensors, and thus fingerprint sensing and touch sensing operations may be performed. Accordingly, a separate touch panel and a separate fingerprint sensing module are not required, and thus a thickness of the display device may be reduced.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A display device comprising:
   a plurality of touch sensing groups,
   wherein each of the plurality of touch sensing groups includes:
   a plurality of write scan circuits;
   a plurality of pixels connected to the plurality of write scan circuits;
   a plurality of sensors connected to the plurality of write scan circuits;
   a plurality of first switching elements switching connections between the plurality of sensors and the plurality of write scan circuits;
   a touch sensing circuit connected to touch sensors connected to one of the plurality of write scan circuits; and
   a second switching element switching a connection between the touch sensing circuit and the touch sensors.

2. The display device of claim 1, wherein in each of the plurality of touch sensing groups, each of the plurality of write scan circuits generate write scan signals and transmit the write scan signals to the plurality of pixels.

3. The display device of claim 2, wherein, during a first sensing mode,
   the plurality of first switching elements are turned on,
   the write scan signals are output as sensing scan signals through the plurality of first switching elements, and
   the sensing scan signals are transmitted to the plurality of sensors.

4. The display device of claim 3, wherein, during the first sensing mode, the second switching element is turned off.

5. The display device of claim 3, wherein, during the first sensing mode, the plurality of sensors sense a fingerprint.

6. The display device of claim 3, wherein
   the touch sensing circuit generates a touch sensing signal,
   the second switching element is turned on during a second sensing mode,
   the touch sensing signal is output as a sensing scan signal through the second switching element, and
   the sensing scan signal is transmitted to the touch sensors.

7. The display device of claim 6, wherein, during the second sensing mode, the plurality of first switching elements are turned off.

8. The display device of claim 6, wherein, during the second sensing mode, the touch sensors sense a touch of a user.

9. The display device of claim 6, wherein, during the first sensing mode and the second sensing mode, the plurality of pixels display an image in response to the write scan signals.

10. The display device of claim 6, wherein
    the plurality of first switching elements are controlled by a first control signal,
    the second switching element is controlled by a second control signal, and
    the first control signal is obtained by inverting the second control signal.

11. The display device of claim 6, wherein an operating frequency of the second sensing mode is greater than an operating frequency of the first sensing mode.

12. The display device of claim 1, wherein in each of the plurality of touch sensing groups, each of the plurality of write scan circuits and the touch sensing circuit have a same circuit configuration.

13. The display device of claim 12, wherein an operating frequency of the touch sensing circuit is greater than an operating frequency of each of the plurality of write scan circuits.

14. The display device of claim 1, wherein in each of the plurality of touch sensing groups each of the plurality of write scan circuits or the touch sensing circuit includes:
    a first transistor including a control electrode receiving a first clock signal, a first electrode receiving a start signal, and a second electrode connected to a first node;
    a second transistor including a control electrode connected to a second node, a first electrode receiving a first voltage, and a second electrode;
    a third transistor including a control electrode receiving a second clock signal that is a signal obtained by inverting the first clock signal, a first electrode connected to the second electrode of the second transistor, and a second electrode connected to the first node;
a fourth transistor including a control electrode connected to the first node, a first electrode connected to the second node, and a second electrode receiving the first clock signal;
a fifth transistor including a control electrode receiving the first clock signal, a first electrode connected to the second node, and a second electrode receiving a second voltage having a level lower than the first voltage;
a sixth transistor including a first electrode receiving the first voltage, a control electrode connected to the second node, and a second electrode connected to an output terminal;
a seventh transistor including a first electrode connected to the output terminal, a second electrode receiving the second clock signal, and a control electrode;
an eighth transistor including a control electrode receiving the second voltage, a first electrode connected to the first node, and a second electrode connected to the control electrode of the seventh transistor;
a first capacitor connected between the control electrode of the sixth transistor and the first electrode of the second transistor; and
a second capacitor connected between the first electrode of the seventh transistor and the control electrode of the seventh transistor.

15. The display device of claim 1, wherein, in each of the plurality of touch sensing groups,
the touch sensing circuit includes at least two touch sensing circuits, and
the at least two touch sensing circuits are connected to the touch sensors connected to at least two of the plurality of write scan circuits.

16. The display device of claim 15, wherein
the second switching element includes at least two second switching elements, and
the at least two second switching elements switch connections between the touch sensors and the at least two touch sensing circuits.

17. A display device comprising:
a plurality of touch sensing groups, wherein each of the plurality of touch sensing groups includes:
a plurality of first write scan circuits;
a second write scan circuit;
a plurality of pixels connected to the plurality of first write scan circuits and the second write scan circuit;
a plurality of sensors connected to the plurality of first write scan circuits and the second write scan circuit;
a first switching element switching a connection between the second write scan circuit and touch sensors connected to the second write scan circuit;
a touch sensing circuit connected to the touch sensors; and
a second switching element switching a connection between the touch sensing circuit and the touch sensors.

18. The display device of claim 17, wherein in each of the plurality of touch sensing groups,
each of the plurality of first write scan circuits and the second write scan circuit generate write scan signals and transmit the write scan signals to the plurality of pixels,
during a first sensing mode,
the first switching element is turned on,
the second switching element is turned off,
the write scan signals are output as a sensing scan signal through the first switching element, and
the sensing scan signal is transmitted to the touch sensors.

19. The display device of claim 18, wherein
the touch sensing circuit generates a touch sensing signal,
during a second sensing mode,
the first switching element is turned off,
the second switching element is turned on,
the touch sensing signal is output as the sensing scan signal through the second switching element, and
the sensing scan signal is transmitted to the touch sensors.

20. The display device of claim 19, wherein the plurality of first write scan circuits, the second write scan circuit, and the touch sensing circuit have a same circuit configuration.

* * * * *